United States Patent
Fujimoto et al.

(10) Patent No.: US 9,208,780 B2
(45) Date of Patent: Dec. 8, 2015

(54) AUDIO SIGNAL SECTION ESTIMATING APPARATUS, AUDIO SIGNAL SECTION ESTIMATING METHOD, AND RECORDING MEDIUM

(75) Inventors: Masakiyo Fujimoto, Kyoto (JP); Tomohiro Nakatani, Kyoto (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 974 days.

(21) Appl. No.: 13/384,917

(22) PCT Filed: Jul. 15, 2010

(86) PCT No.: PCT/JP2010/061999
§ 371 (c)(1),
(2), (4) Date: Mar. 12, 2012

(87) PCT Pub. No.: WO2011/010604
PCT Pub. Date: Jan. 27, 2011

(65) Prior Publication Data
US 2012/0173234 A1     Jul. 5, 2012

(30) Foreign Application Priority Data
Jul. 21, 2009   (JP) .................................. 2009-169788

(51) Int. Cl.
*G10L 15/20* (2006.01)
*G10L 15/14* (2006.01)
*G10L 21/02* (2013.01)

(52) U.S. Cl.
CPC ............ *G10L 15/20* (2013.01); *G10L 15/14* (2013.01); *G10L 21/02* (2013.01)

(58) Field of Classification Search
USPC ........................................................ 704/233
See application file for complete search history.

(56) References Cited

U.S. PATENT DOCUMENTS 5,950,158 A * 9/1999 Wang ............................. 704/244
6,631,348 B1 * 10/2003 Wymore ....................... 704/233

(Continued)

FOREIGN PATENT DOCUMENTS

JP     2001 343984     12/2001
JP     2002 132289     5/2002

OTHER PUBLICATIONS

Ishizuka et al., Study of Integration of Statistical Model-Based Voice Activity Detection and Noise Suppression, Sep. 2008, pp. 2008-2011.*

(Continued)

*Primary Examiner* — David Hudspeth
*Assistant Examiner* — Timothy Nguyen
(74) *Attorney, Agent, or Firm* — Oblon, McClelland, Maier & Neustadt, L.L.P.

(57) ABSTRACT

The processing efficiency and estimation accuracy of a voice activity detection apparatus are improved. An acoustic signal analyzer receives a digital acoustic signal containing a speech signal and a noise signal, generates a non-speech GMM and a speech GMM adapted to a noise environment, by using a silence GMM and a clean-speech GMM in each frame of the digital acoustic signal, and calculates the output probabilities of dominant Gaussian distributions of the GMMs. A speech state probability to non-speech state probability ratio calculator calculates a speech state probability to non-speech state probability ratio based on a state transition model of a speech state and a non-speech state, by using the output probabilities; and a voice activity detection unit judges, from the speech state probability to non-speech state probability ratio, whether the acoustic signal in the frame is in the speech state or in the non-speech state and outputs only the acoustic signal in the speech state.

14 Claims, 21 Drawing Sheets

(56) References Cited

U.S. PATENT DOCUMENTS

| | | | |
|---|---|---|---|
| 2002/0049587 A1* | 4/2002 | Miyazawa | 704/233 |
| 2005/0105795 A1* | 5/2005 | Singh et al. | 382/160 |
| 2005/0182624 A1* | 8/2005 | Wu et al. | 704/233 |
| 2006/0136205 A1* | 6/2006 | Song | 704/243 |

OTHER PUBLICATIONS

Nomura et al., Spectral subtraction based on speech/noise-dominant classification, Sep. 2003, International Workshop on Acoustic Echo and Noise Control, pp. 127-130.*

M. Fujimoto, et al., "A noise robust voice activity detection with state transition processes of speech and noise", IEICE Technical Report, pp. 1-6, Dec. 14, 2006.

M. Fujimoto, et al., "Study of Integration of Statistical Model-Based Voice Activity Detection and Noise Suppression", Proc. Interspeech '08 incorporating SST 2008, pp. 2008-2011, Sep. 2008.

T. Nakatani, et al., "Robust and accurate fundamental frequency estimation based on dominant harmonic components", Journal of the Acoustical Society of America, vol. 116, pp. 3690-3700; Dec. 2004.

T. F. Quatieri, "Discrete-Time Speech Signal Processing: principles and practice", Prentice-Hall PTR, USBN: 0-13-242942-X; pp. 504-505; 2002.

ETSI ES 202 050 V1.1.4, "Speech Processing, Transmission and Quality Aspects (STQ); Distributed speech recognition; Advanced front-end feature extraction algorithm; Compression algorithms," p. 18-p. 19, Nov. 2005.

N. Kitaoka, et al., CENSREC-1-C: Development of evaluation framework for voice activity detection under noisy environment, IPSJ SIG Technical Report, SLP-63-1, pp. 1-6, Oct. 2006.

M. Fujimoto, et al., "Noise Robust Voice Activity Detection Based on Switching Kalman Filter", Proceedings of Interspeech 2007, ISSN: 1990-9772, pp. 2933-2936, Aug. 2007.

N. Kitaoka, et al., "Development of VAD evaluation framework CENSREC-1-C and Investigation of relationship between VAD and speech regogonition performance", 2007 IEEE Automatic Speech Recognition and Understanding Workshop, ISBN: 978-1-4244-1746-9, pp. 607-612, Dec. 2007.

International Search Report issued on Aug. 10, 2010 in PCT/JP10/061999 filed on Jul. 15, 2010.

* cited by examiner

A1

| CORRECT RATE OF VOICE ACTIVITY DETECTION (CORRECT RATE) [%] | a | b | c |
|---|---|---|---|
| High SNR | 74.20 | 39.42 | 56.81 |
| Low SNR | 56.52 | 41.45 | 48.99 |
| c | 65.36 | 40.44 | 52.90 |

A2

| ACCURACY OF VOICE ACTIVITY DETECTION (ACCURACY) [%] | a | b | c |
|---|---|---|---|
| High SNR | 21.45 | -15.65 | 2.90 |
| Low SNR | -43.48 | -33.91 | -38.70 |
| c | -11.02 | -24.78 | -17.90 |

B1

| CORRECT RATE OF VOICE ACTIVITY DETECTION (CORRECT RATE) [%] | a | b | c |
|---|---|---|---|
| High SNR | 93.04 | 100.00 | 96.52 |
| Low SNR | 70.72 | 97.97 | 84.35 |
| c | 81.88 | 98.99 | 90.43 |

B2

| ACCURACY OF VOICE ACTIVITY DETECTION (ACCURACY) [%] | a | b | c |
|---|---|---|---|
| High SNR | 72.75 | 99.13 | 85.94 |
| Low SNR | 19.71 | 94.78 | 57.25 |
| c | 46.23 | 96.96 | 71.59 |

C1

| CORRECT RATE OF VOICE ACTIVITY DETECTION (CORRECT RATE) [%] | a | b | c |
|---|---|---|---|
| High SNR | 95.07 | 100.00 | 97.54 |
| Low SNR | 73.04 | 100.00 | 86.52 |
| c | 84.06 | 100.00 | 92.03 |

C2

| ACCURACY OF VOICE ACTIVITY DETECTION (ACCURACY) [%] | a | b | c |
|---|---|---|---|
| High SNR | 81.16 | 100.00 | 90.58 |
| Low SNR | 25.80 | 98.26 | 62.03 |
| c | 53.48 | 99.13 | 76.31 | a : CAFETERIA    b : STREET    c : AVERAGE

FIG. 20

AUDIO SIGNAL SECTION ESTIMATING APPARATUS, AUDIO SIGNAL SECTION ESTIMATING METHOD, AND RECORDING MEDIUM

CROSS-REFERENCE TO RELATED APPLICATIONS

The present application is based upon and claims the benefit of priority from Japanese Patent Application No. 2009-169788 filed on Jul. 21, 2009, the entire contents of which are incorporated herein by reference into this application.

TECHNICAL FIELD

The present invention relates to a voice activity detection apparatus for estimating a period where a speech signal is present from a signal containing various acoustic signals, to a voice activity detection method, to a program for implementing the apparatus with a computer, and to a recording medium on which the program is recorded.

BACKGROUND ART

When automatic speech recognition technologies are used in a real-world environment, a period where a target speech signal is present should be estimated from an acoustic signal containing noise together with the target speech signal, and then, the noise should be removed.

FIG. 22 shows a functional configuration for implementing a conventional voice activity detection method disclosed in Non-Patent Literature 1, as a conventional voice activity detection apparatus 900, and the operation thereof will be described briefly. The voice activity detection apparatus 900 includes an acoustic signal analyzer 90, a speech state probability to non-speech state probability ratio calculator 95, and a voice activity detection unit 96. The acoustic signal analyzer 90 includes an acoustic feature extraction unit 91, a probability estimation unit 92, a parameter storage 93, and a GMM (Gaussian mixture model) storage 94. The parameter storage 93 includes an initial noise probabilistic model estimation buffer 930 and a noise probabilistic model estimation buffer 931. The GMM storage 94 includes a silence GMM storage 940 and a clean-speech GMM storage 941, which respectively have stored silence GMM and clean-speech GMM generated beforehand.

The acoustic feature extraction unit 91 extracts an acoustic feature $O_t$ of a digital acoustic signal $A_t$ containing a speech signal and a noise signal. As the acoustic feature, a logarithmic mel spectrum or a cepstrum can be used, for example. The probability estimation unit 92 generates a non-speech GMM and a speech GMM adapted to a noise environment, by using a silence GMM and a clean-speech GMM, and calculates the non-speech probabilities of all the Gaussian distributions in the non-speech GMM and the speech probabilities of all the Gaussian distributions in the speech GMM, corresponding to the input acoustic feature $O_t$.

The speech state probability to non-speech state probability ratio calculator 95 calculates a speech state probability to non-speech state probability ratio by using the non-speech probabilities and the speech probabilities. The voice activity detection unit 96 judges from the speech state probability to non-speech state probability ratio whether the input acoustic signal is in a speech state or in a non-speech state and outputs just the acoustic signal $D_s$ in the speech state, for example.

In the conventional voice activity detection method, all of the Gaussian distributions in the GMMs are used to estimate a speech period, as described above. All of the Gaussian distributions are used because all of them are considered to be important. This idea is shown as methods of voice activity detection and noise suppression in Non-Patent Literature 2, for example. The idea of using all Gaussian distributions is clearly indicated also by the following expression (1) for calculating the filter gain of a noise suppression filter, given in Non-Patent Literature 2.

$$\hat{G}_{t,1} = \sum_{j=0}^{1} \alpha_{j,t} \sum_{k=1}^{K} p(k \mid O_{t,j}) \hat{G}_{t,j,k,1} \tag{1}$$

Here, $p(k|O_{t,j})$ is the output probability of a k-th Gaussian distribution, and K represents the total number of distributions.

PRIOR ART LITERATURE

Non-Patent Literature

Non-Patent Literature 1: Masakiyo Fujimoto, Kentaro Ishizuka, and Hiroko Kato, "A noise robust voice activity detection with state transition processes of speech and noise," IEICE Technical Report, Dec. 14, 2006

Non-Patent Literature 2: Masakiyo Fujimoto, Kentaro Ishizuka, and Tomohiro Nakatani, "Study of Integration of Statistical Model-Based Voice Activity Detection and Noise Suppression," Proc. Interspeech '08, pp. 2008-2011, September 2008.

SUMMARY OF THE INVENTION

Problems to be Solved by the Invention

Since all Gaussian distributions are used in voice activity detection and noise suppression in the conventional method, a large amount of information must be processed. If a multi-channel acoustic signal is input, individual processing is required in each channel, which further increases the amount of information to be processed.

The present invention has been made in view of the above problem. Recent studies show that voice activity detection and noise suppression do not require all of the Gaussian distributions. Therefore, it is an object of the present invention to provide a voice activity detection apparatus whose processing speed is increased by not using unnecessary distributions in the probabilistic models (GMMs), a voice activity detection method therefor, a program for implementing the apparatus with a computer, and a recording medium having recorded the program thereon.

Means to Solve the Problems

A voice activity detection apparatus according to the present invention includes an acoustic signal analyzer and a speech detection information generator. The acoustic signal analyzer receives a digital acoustic signal containing a speech signal and noise signal, generates a non-speech GMM and a speech GMM both adapted to a noise environment, by using a silence GMM and a clean-speech GMM in each frame of the digital acoustic signal, and calculates non-speech probabilities and speech probabilities of Gaussian distributions left after one or more Gaussian distributions having the smallest output probability are pruned from each GMM. The speech detection information generator calculates a speech state probability to non-speech state probability ratio based on a state transition model of a speech state and a non-speech state, by using the non-speech probabilities and the speech probabilities, and generates and outputs speech detection information based on the calculated probability ratio.

A voice activity detection apparatus with a noise suppression function according to the present invention includes, in addition to the structure of the voice activity detection apparatus described above, a noise suppressor that receives the probability ratio output from a speech state probability to non-speech state probability ratio calculator and the output probabilities output from the acoustic signal analyzer, generates a noise suppression filter, and suppresses noise in the digital acoustic signal.

Effects of the Invention

In the voice activity detection apparatus according to the present invention, the acoustic signal analyzer generates non-speech and speech probabilistic models adapted to the noise environment by using the silence GMM and the clean-speech GMM in each frame and calculates the output probabilities of probabilistic models of dominant distributions only. By using the output probabilities given by dominant distributions, a speech period is detected. Therefore, in comparison with the conventional voice activity detection apparatus that uses all of the Gaussian distributions, the processing speed can be improved.

The voice activity detection apparatus with the noise suppression function according to the present invention is also provided by adding the noise suppressor to the voice activity detection apparatus according to the present invention, to suppress noise in the input speech signal.

BRIEF DESCRIPTION OF THE DRAWINGS

FIG. 8 is a view showing example probability value distributions.

FIG. 20 is a view showing experimental results;

FIG. 21A shows the waveform of an input acoustic signal; FIG. 21B shows the waveform of an output noise-suppressed signal.

DETAILED DESCRIPTION OF THE EMBODIMENTS

Figure 1:
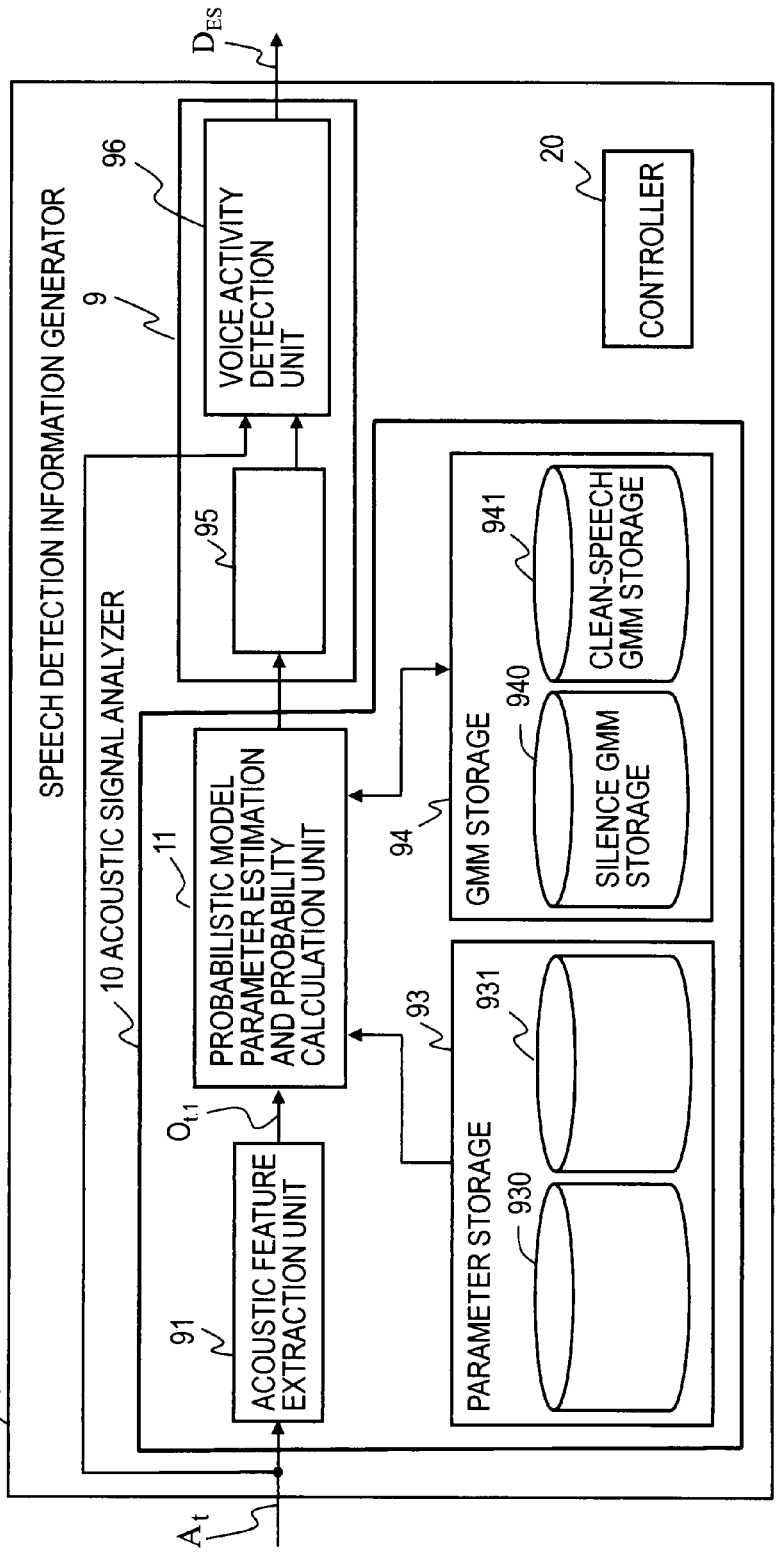
FIG. 1 is a view showing an example functional configuration of a voice activity detection apparatus 100 according to the present invention.

Now, embodiments of the present invention will be described with reference to the drawings. Identical elements in multiple drawings will be denoted by the same reference numerals, and their description will not be repeated. Although the caret ^ should originally be placed above a letter, it is placed immediately before the letter in text lines of the description given below, because of limitations in text notation. In expressions, the caret is placed where it should be. Vectors are expressed by adding a preceding word "vector" as in "vector A" in the text and just by bold letters A etc. in expressions. Processing executed in units of elements of a vector is applied to all the elements of all the vectors, unless otherwise specified.

First Embodiment

Figure 2:
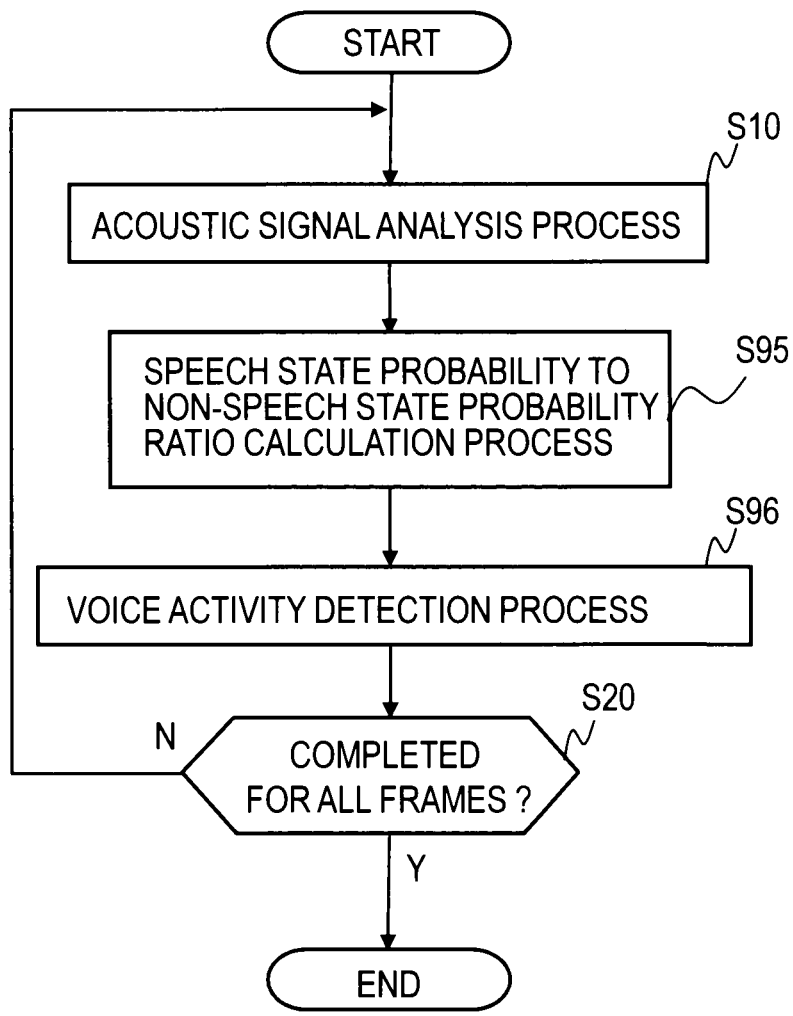
FIG. 2 is a view showing the operation flow of the voice activity detection apparatus 100.

FIG. 1 shows an example functional configuration of a voice activity detection apparatus 100 according to the present invention. The operation flow thereof is shown in FIG. 2. The voice activity detection apparatus 100 includes an acoustic signal analyzer 10, a speech state probability to non-speech state probability ratio calculator 95, a voice activity detection unit 96, and a controller 20. The acoustic signal analyzer 10 includes an acoustic feature extraction unit 91, a probabilistic model parameter estimation and probability calculation unit 11, a GMM storage 94, and a parameter storage 93. The GMM storage 94 includes a silence GMM storage 940 and a clean-speech GMM storage 941. The parameter storage 93 includes an initial noise probabilistic model estimation buffer 930 and a noise probabilistic model estimation buffer 931. The speech state probability to non-speech state probability ratio calculator 95 and the voice activity detection unit 96 form a speech detection information generator 9.

An acoustic signal $A_t$, which is an input signal to the voice activity detection apparatus 100, is a digital acoustic signal obtained by discretizing an analog acoustic signal containing a speech signal and a noise signal at a sampling frequency of 8 kHz, for example. The subscript "t" represents a frame number. In FIG. 1, an analog-to-digital converter for converting the analog acoustic signal to the digital acoustic signal is omitted.

Figure 22:
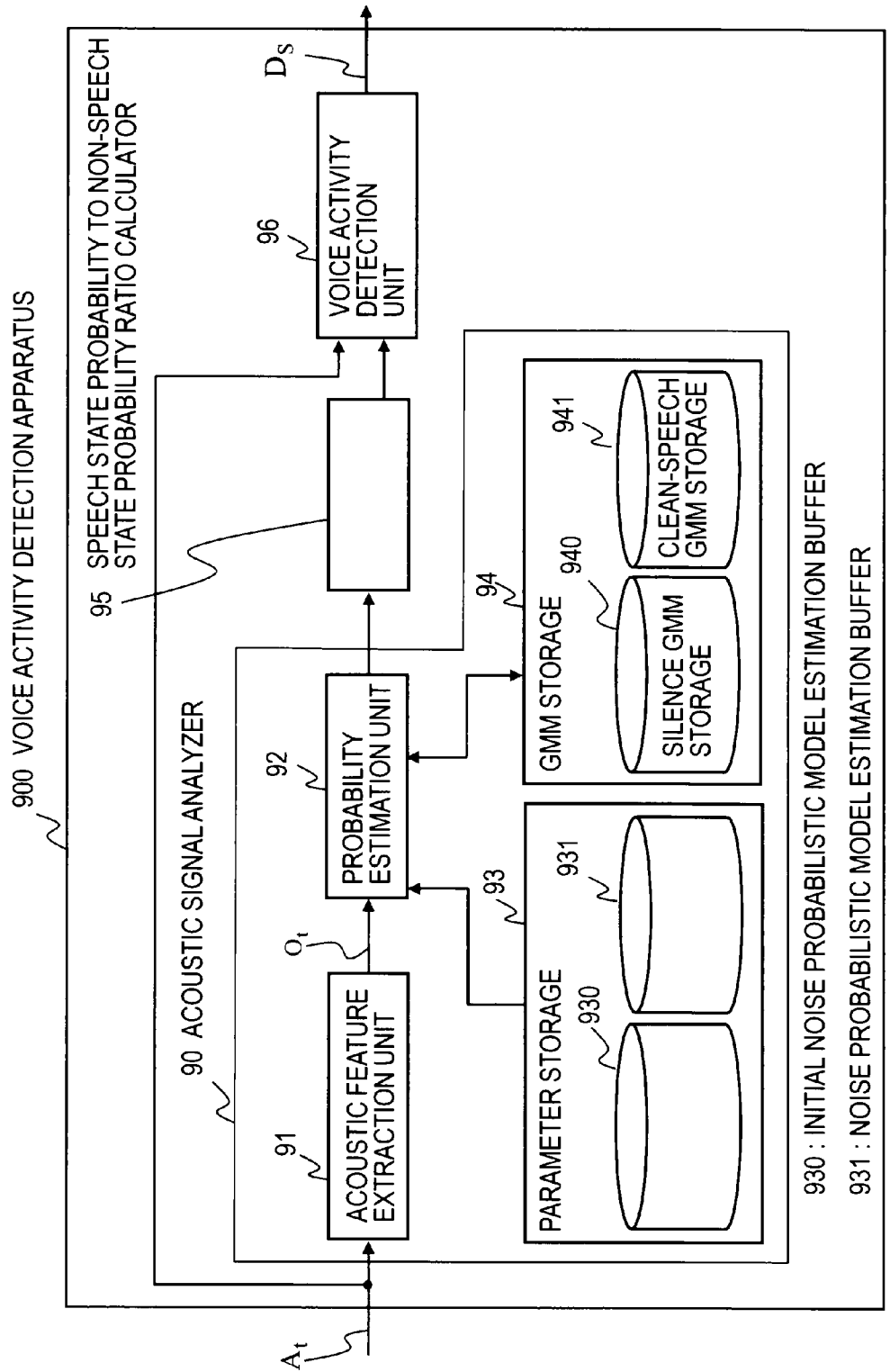
FIG. 22 is a view showing an example functional configuration of a conventional voice activity detection apparatus 900.

The voice activity detection apparatus 100 is implemented by a computer formed of a ROM, a RAM, a CPU, etc. when a given program is read into the computer and executed by the CPU, for example. As the reference numerals indicate, the voice activity detection apparatus 100 differs from the conventional voice activity detection apparatus 900 shown in FIG. 22 only in the configuration and operation of a part of the acoustic signal analyzer 10. The probabilistic model parameter estimation and probability calculation unit 11 in the acoustic signal analyzer 10 generates a non-speech GMM and a speech GMM adapted to a noise environment in each frame and calculates the output probabilities of dominant Gaussian distributions in the respective GMMs.

The acoustic signal analyzer 10 receives a discretized digital speech signal $A_t$, generates a non-speech GMM and a speech GMM adapted to a noise environment by using a silence GMM and a clean-speech GMM stored in the GMM storage 94, in each frame (25 ms, for example), a single frame being composed of two hundred digital acoustic signals, for example, and calculates the non-speech probabilities and the speech probabilities of required Gaussian distributions in the respective GMMs (step S10).

The acoustic feature extraction unit 91 performs a fast Fourier transform and twelve-dimensional mel filter bank analysis of the digital acoustic signal $A_t$ of frame t, containing a speech signal and a noise signal, and calculates and outputs a vector $O_t = \{O_{t,0}, O_{t,1}, \ldots, O_{t,11}\}$ (acoustic feature in frame t) having twelve-dimensional logarithmic mel spectra as its element. The subscripts 0 to 11 indicate 1 vector element numbers.

The probabilistic model parameter estimation and probability calculation unit 11 estimates the noise probabilistic model parameters by applying a parallel non-linear Kalman filter to the logarithmic mel spectra input in each frame. The parallel non-linear Kalman filter will be described later.

The silence GMM storage 940 and the clean-speech GMM storage 941 of the GMM storage 94 respectively store silence GMM and clean-speech GMM generated beforehand. Each GMM contains various Gaussian distributions, and each Gaussian distribution is specified by these parameters: mixture weight $w_{j,k}$, mean $\mu_{S,j,k,l}$, and variance $\Sigma_{S,j,k,l}$. The subscript j indicates a GMM type, where j=0 represents the silence GMM, and j=1 represents the clean-speech GMM. The subscript k indicates a Gaussian distribution number. The total number K of distributions is 32, for example. The K value is determined in consideration of the trade-off between performance and processing speed.

The speech state probability to non-speech state probability ratio calculator 95 calculates a speech state probability to non-speech state probability ratio based on a state transition model of a speech state and a non-speech state by using the output probabilities (step S95). The voice activity detection unit 96 compares the speech state probability to non-speech state probability ratio with a threshold and determines whether the acoustic signal in the frame is in the speech state or in the non-speech state, then extracts just the acoustic signal in the speech state, for example, and outputs it as speech detection information $D_{ES}$ (step S96). The voice activity detection unit 96 may output a signal indicating a speech period and a non-speech period in the acoustic signal, alone or together with the input acoustic signal, as the speech period information. Alternatively, the voice activity detection unit 96 may set the amplitude of the non-speech period of the acoustic signal to zero based on the signal indicating the determined period and output it as the speech period information, or may remove the non-speech period (shorten the period) and output the remaining part as the speech period information, as described earlier. In other words, the speech detection information generator 9 formed of the speech state probability to non-speech state probability ratio calculator 95 and the voice activity detection unit 96 generates and outputs information on the speech period (speech period information).

These steps are repeated (N in step S20) until the operation has been completed for all frames. The operation of the components of the voice activity detection apparatus 100 is controlled by the controller 20.

In the voice activity detection apparatus 100, the acoustic signal analyzer 10 calculates the output probabilities of dominant Gaussian distributions alone. On the basis of the output probabilities, just the acoustic signal in each frame determined to be in the speech state, for example, is output as speech detection information $D_{ES}$. Since the voice activity detection is performed by using dominant Gaussian distributions alone, the processing speed can be increased.

A more detailed example functional configuration of the probabilistic model parameter estimation and probability calculation unit 11 will be given next and explained in more detail.

Probabilistic Model Parameter Estimation and Probability Calculation Unit 11

Figure 3:
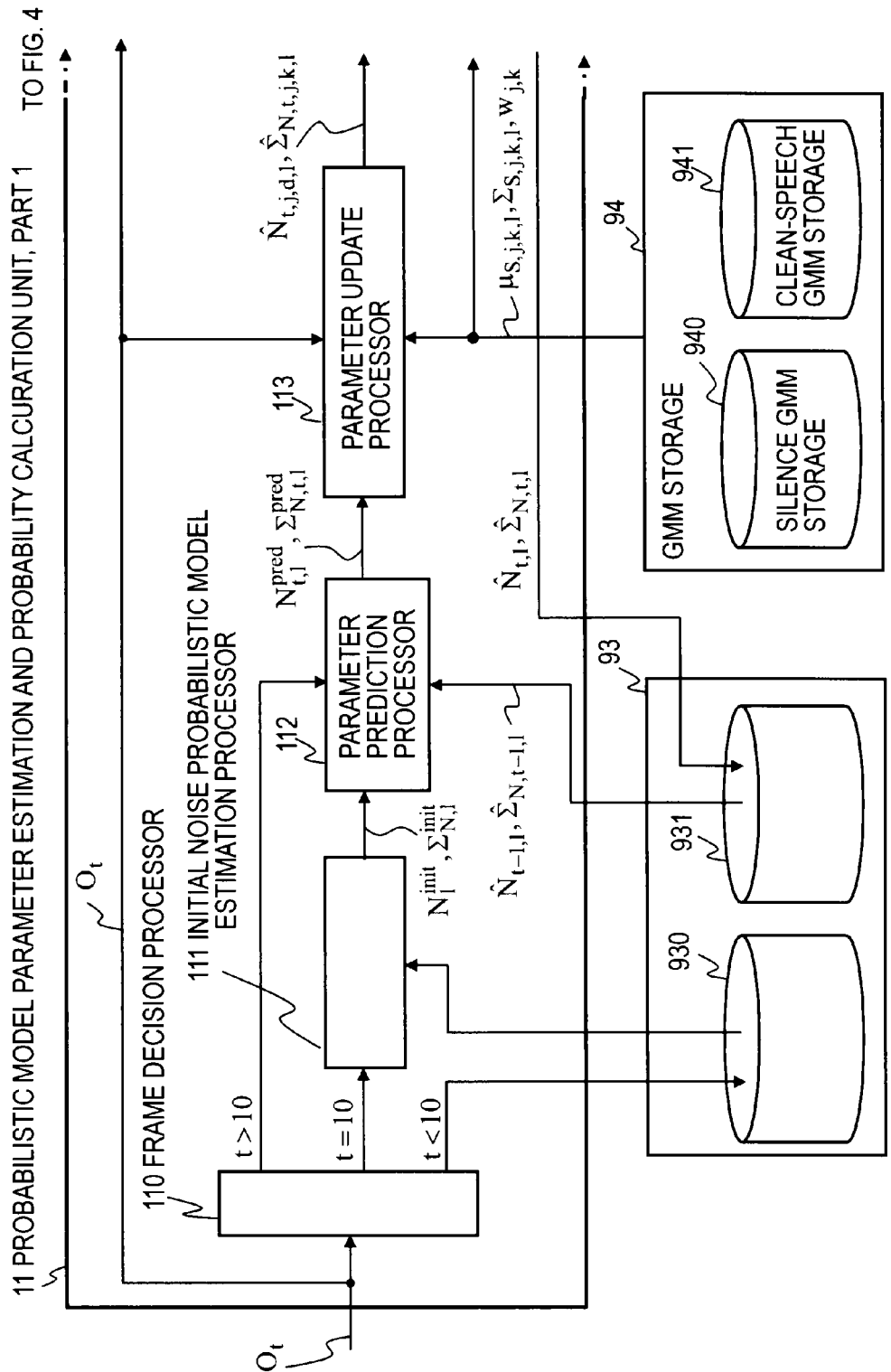
FIG. 3 is a view showing a part of an example functional configuration of a probabilistic model parameter estimation and probability calculation unit 11.
Figure 4:
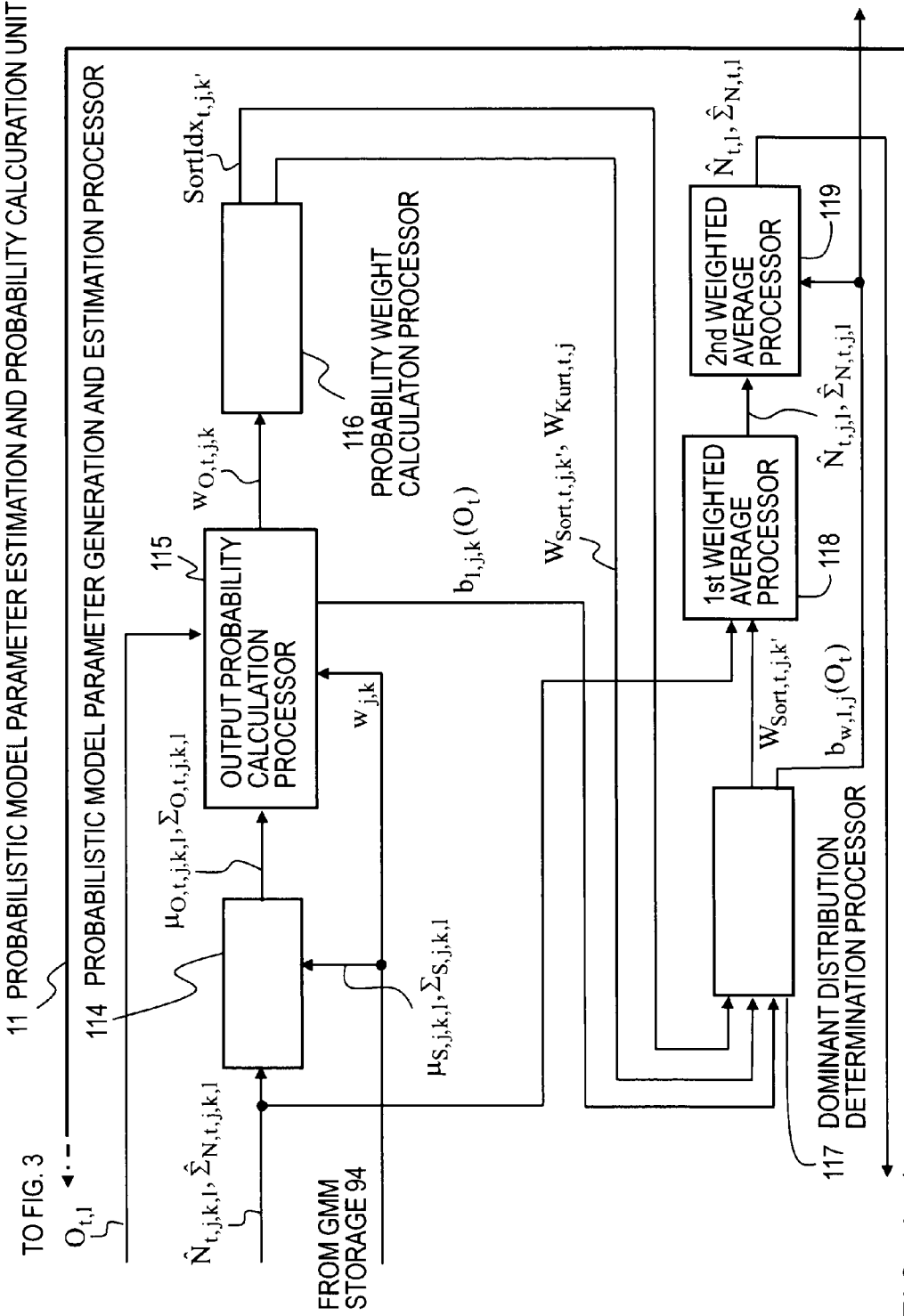
FIG. 4 is a view showing the remaining part of the example functional configuration of the probabilistic model parameter estimation and probability calculation unit 11.
Figure 5:
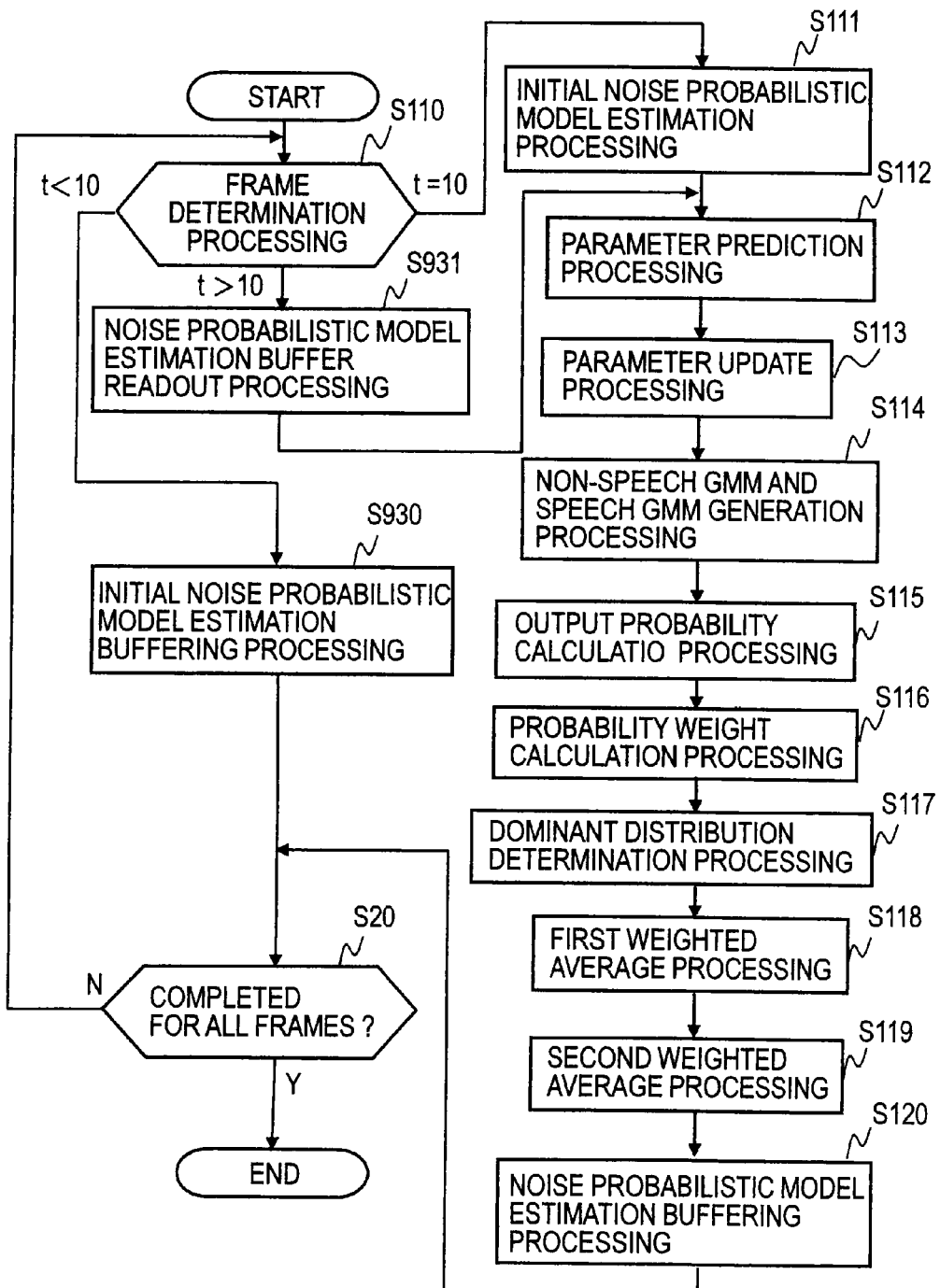
FIG. 5 is a view showing the operation flow of a probabilistic model parameter estimation and probability calculation unit 11.

FIGS. 3 and 4 show, in more detail, the two different parts of the example functional configuration of the probabilistic model parameter estimation and probability calculation unit 11, and FIG. 5 shows the operation flow thereof. The probabilistic model parameter estimation and probability calculation unit 11 includes a frame decision processor 110, an initial noise probabilistic model estimation processor 111, a parameter prediction processor 112, a parameter update processor 113, a probabilistic model parameter generation and estimation processor 114, an output probability calculation processor 115, a probability weight calculation processor 116, a dominant distribution determination processor 117, a first weighted average processor 118, and a second weighted average processor 119.

The frame decision processor 110 stores the acoustic feature $O_t$ from the acoustic feature extraction unit 91 in the initial noise probabilistic model estimation buffer 930, in the initial stage at the beginning of operation, for example, for up to ten frames, that is, when the frame number t<10 (t=0, 1, . . . ) (step S930). When the number of frames becomes 11 (t=10), the initial noise probabilistic model estimation processor 111 is given instructions to read the acoustic features of frames t=0 to t=9. The initial noise probabilistic model estimation processor 111 estimates the initial noise probabilistic model parameters $N^{init}_l$ and $\Sigma^{init}_{N,l}$, as given by Expressions (2) and (3) (step S111).

$$N_1^{init} = \frac{1}{10}\sum_{t=0}^{9} O_{t,1} \quad (2)$$

$$\sum_{N,1}^{init} = \frac{1}{10}\sum_{t=0}^{9}(O_{t,1} - N_1^{init})^2 \quad (3)$$

When the number of frames exceeds 11 (t>10), the frame decision processor 110 gives the parameter prediction processor 112 instructions to read the estimated values $\hat{N}_{t-1,l}$ and $\hat{\Sigma}_{N,t-1,l}$ of the noise probabilistic model parameters of the preceding frame from the noise probabilistic model estimation buffer 931 (step S931).

The parameter prediction processor 112 predicts noise probabilistic model parameters of the current frame t from the initial noise probabilistic model parameters $N^{init}_{l}$ and $\Sigma^{init}_{N,l}$ or the estimated values $\hat{N}_{t-1,l}$ and $\hat{\Sigma}_{N,t-1,k}$ of the noise probabilistic model parameters of the preceding frame by the random walk process given by Expressions (4) and (5) (step S112).

$$N_{t,l}^{pred} = \hat{N}_{t-1,l} \tag{4}$$

$$\Sigma_{N,t,l}^{pred} = \hat{\Sigma}_{N,t-1,l} + \epsilon \tag{5}$$

Here, $N^{pred}_{t,l}$ and $\Sigma^{pred}_{N,t,l}$ are predicted values of the noise probabilistic model parameters in frame t, and $\epsilon$ is a small value, such as 0.0010, for example. If the number of frames is 10 (t=9), prediction processing is performed as given by Expressions (6) and (7).

$$N_{t,l}^{pred} = N_{l}^{init} \tag{6}$$

$$\Sigma_{N,t,l}^{pred} = \Sigma_{N,l}^{init} + \epsilon \tag{7}$$

The parameter update processor 113 receives the predicted noise probabilistic model parameters $NP^{pred}_{t,l}$ and $\Sigma^{pred}_{N,t,l}$ of the current frame t, the acoustic feature $O_t$, and parameters $\mu_{S,j,k,l}$ and $\Sigma_{S,j,k,l}$ of various Gaussian distributions of each GMM in the GMM storage 94 and updates the noise probabilistic model parameters $N^{pred}_{t,l}$ and $\Sigma^{pred}_{N,t,l}$ of Expressions (4) and (5) or (6) and (7) (step S113). The update processing is performed by applying the non-linear Kalman filter represented by Expressions (8) to (13) in each frame.

$$y_{t,j,k,1} = \mu_{S,j,k,1} + \log(1 + \exp(N_{t,1}^{pred} - \mu_{S,j,k,1})) \tag{8}$$

$$\frac{\partial y_{t,j,k,1}}{\partial N_{t,1}^{pred}} = \frac{\exp(N_{t,1}^{pred} - \mu_{S,j,k,1})}{1.0 + \exp(N_{t,1}^{pred} - \mu_{S,j,k,1})} \tag{9}$$

$$H \equiv \frac{\partial y_{t,j,k,1}}{\partial N_{t,1}^{pred}} \tag{10}$$

$$\sum\nolimits_{y,t,j,k,1} = H \sum\nolimits_{N,t,1}^{pred} H + \sum\nolimits_{S,j,k,1} \tag{11}$$

$$G = \frac{H \sum\nolimits_{N,t,1}^{pred}}{\sum\nolimits_{y,t,j,k,1}}$$

$$\hat{N}_{t,j,k,1} = N_{t,1}^{pred} + G(O_{t,1} - y_{t,j,k,1}) \tag{12}$$

$$\hat{\sum}\nolimits_{N,t,j,k,1} = (1 - GH) \sum\nolimits_{N,t,1}^{pred} \tag{13}$$

Here, Expressions (12) and (13) show the updated Gaussian distribution parameters. This non-linear Kalman filtering is a conventional technique.

The probabilistic model parameter generation and estimation processor 114 receives the various Gaussian distribution parameters $\mu_{S,j,k,l}$ and $\Sigma_{S,j,k,l}$ stored in the GMM storage 94 and Gaussian distribution parameters $\hat{N}_{t,j,k,l}$ and $\hat{\Sigma}_{N,t,j,k,l}$ updated in the parameter update processor 113 and generates a non-speech GMM (noise+silence) and a speech GMM (noise+clean speech) adapted to the noise environment in frame t (step S114). The non-speech GMM and speech GMM can be obtained by the following expressions.

$$\mu_{O,t,j,k,1} = \mu_{S,j,k,1} + \log(1 + \exp(\hat{N}_{t,j,k,1} - \mu_{S,j,k,1})) \tag{14}$$

$$H = \frac{\exp(\hat{N}_{t,j,k,1} - \mu_{S,j,k,1})}{1.0 + \exp(\hat{N}_{t,j,k,1} - \mu_{S,j,k,1})} \tag{15}$$

$$\sum\nolimits_{O,t,j,k,1} = H \sum\nolimits_{N,t,j,k,1}^{\hat{}} H + \sum\nolimits_{S,j,k,1} \tag{16}$$

Here, and $\mu_{O,t,j,k,l}$ and $\Sigma_{O,t,j,k,l}$ are Gaussian distribution parameters of the non-speech GMM (j=0) and speech GMM (j=1) in frame t; $\mu$ is the mean; and $\Sigma$ is the variance.

The output probability calculation processor 115 obtains the output probabilities of the acoustic feature $O_t$ in the non-speech GMM and the speech GMM generated by the probabilistic model parameter generation and estimation processor 114, as given by the following expression. The output probability $b_{1,j,k}(O_t)$ of each Gaussian distribution k is calculated as given by Expression (17). The subscript 1 is added to the symbol b to distinguish it from the output probability obtained by the second acoustic signal analyzer in a second embodiment described later.

$$b_{1,j,k}(O_t) = \prod_{l=0}^{L-1} \frac{1}{\sqrt{2\pi \sum\nolimits_{O,t,j,k,l}}} \exp\left\{-\frac{(O_{t,l} - \mu_{O,t,j,k,l})^2}{2 \sum\nolimits_{O,t,j,k,l}}\right\} \tag{17}$$

The output probability $b_{1,j,k}(O_t)$ of the Gaussian distribution k is multiplied by the mixture weight $w_{j,k}$ stored in the GMM storage 94, as given by Expression (18), and the sum of the obtained output probabilities of all the distributions is the output probability $b_{1,j}(O_t)$ in each of the non-speech GMM and the speech GMM.

$$b_{1,j}(O_t) = \sum_{k=1}^{K} w_{j,k} b_{1,j,k}(O_t) \tag{18}$$

The output probability calculation processor 115 calculates the output probability $w_{O,t,j,k}$ obtained by normalizing the output probability of each Gaussian distribution k by the output probability $b_{1,j}(O_t)$ in each of the non-speech GMM and the speech GMM, as given in Expression (19), and outputs the result.

$$w_{O,t,j,k} = \frac{w_{j,k} b_{1,j,k}(O_t)}{b_{1,j}(O_t)} \tag{19}$$

Figure 6:
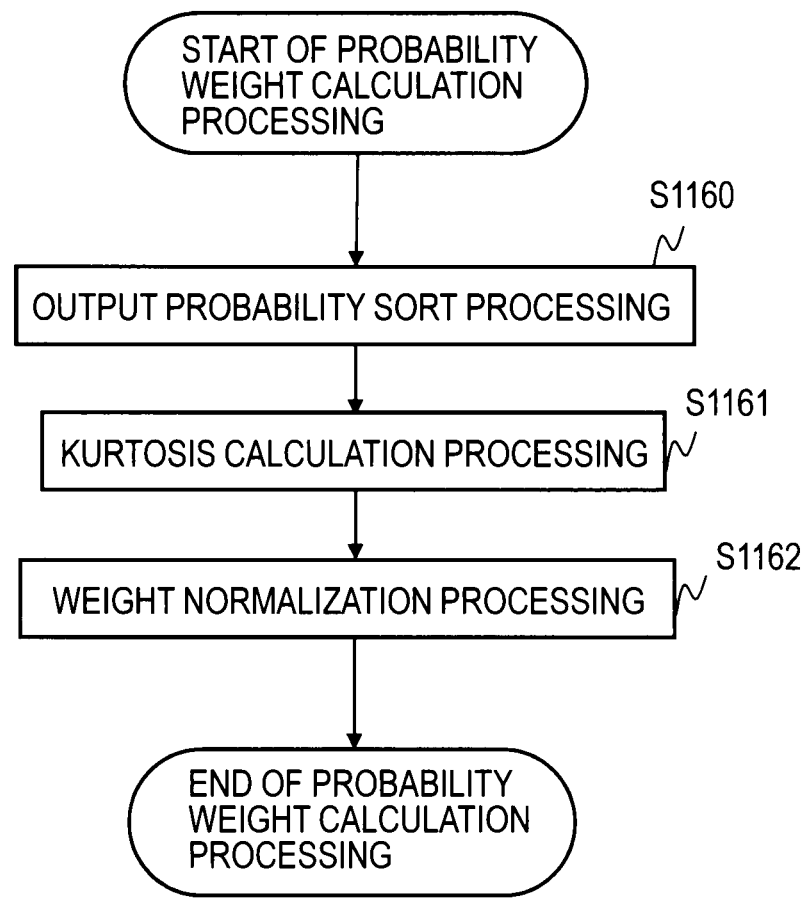
FIG. 6 is a view showing the operation flow of a probability weight calculation processor 116.

The probability weight calculation processor 116 parameterizes the distribution of the normalized output probabilities $w_{O,t,j,k}$ of all the Gaussian distributions k=1, . . . , K contained in the non-speech GMM and speech GMM, with a higher-order statistic, and weights the output probabilities $b_{1,j}(O_t)$ of the non-speech GMM and speech GMM (step S116). FIG. 6 shows the processing flow of the probability weight calculation processor 116.

Figure 7:
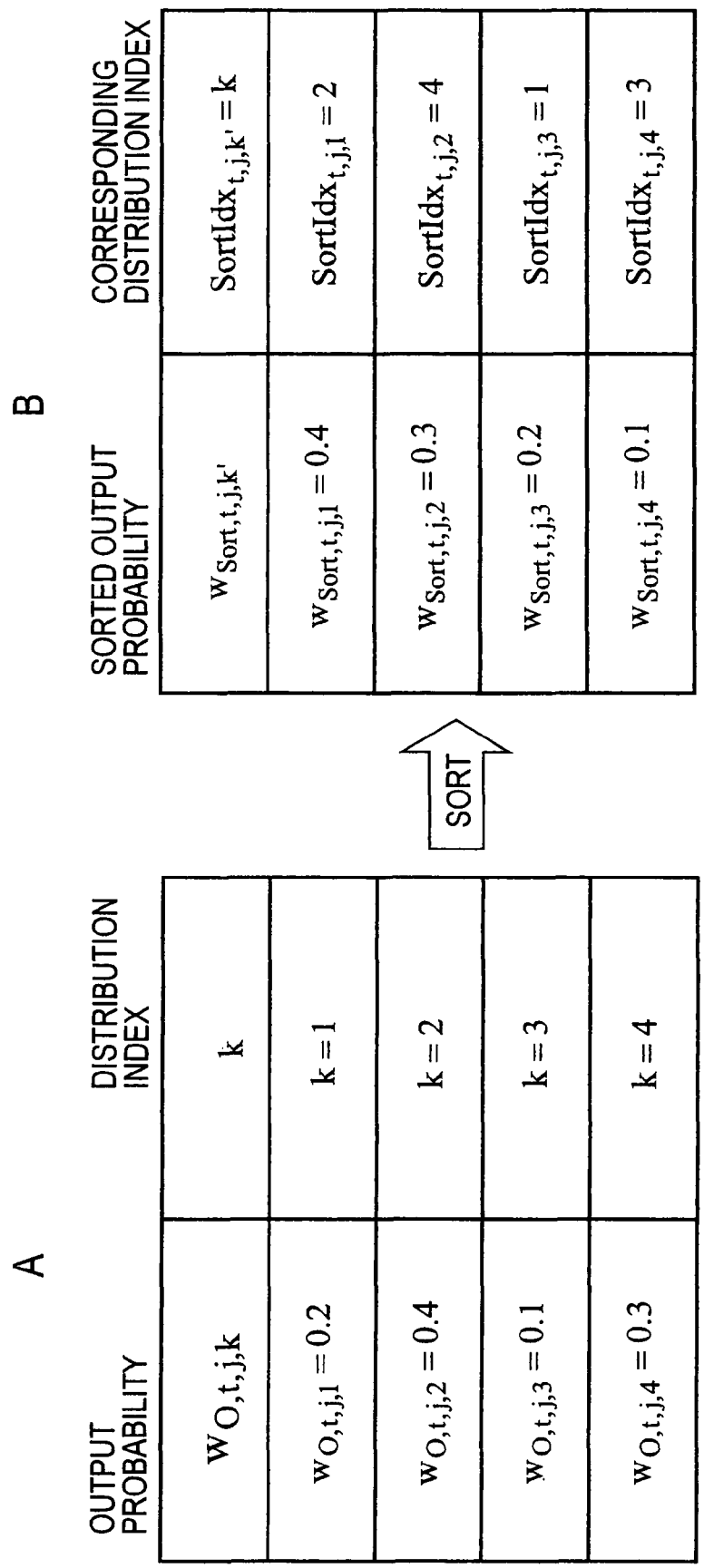
FIG. 7 is a view showing a method of obtaining a Gaussian distribution number $SortIdx_{t,j,k}$.

The probability weight calculation processor 116 first sorts out the normalized output probabilities $w_{O,t,j,k}$ of the Gaussian distributions k in descending order and obtains the corresponding Gaussian distribution indices SortIdx$_{t,j,k}$(k'=1, . . . , K) after sorting (step S1160). FIG. 7 shows a method of obtaining the Gaussian distribution indices SortIdx$_{t,j,k'}$ after sorting.

FIG. 7A shows the normalized output probabilities w$_{O,t,j,k}$ before sorting and their Gaussian distribution indices k. FIG. 7B shows the normalized output probabilities w$_{Sort,t,j,k'}$ after sorting in descending order and the corresponding distribution indices SortIdx$_{t,j,k'}$. The Gaussian distributions are arranged depending on descending order of normalized output probability (step S1160).

Figure 8A:
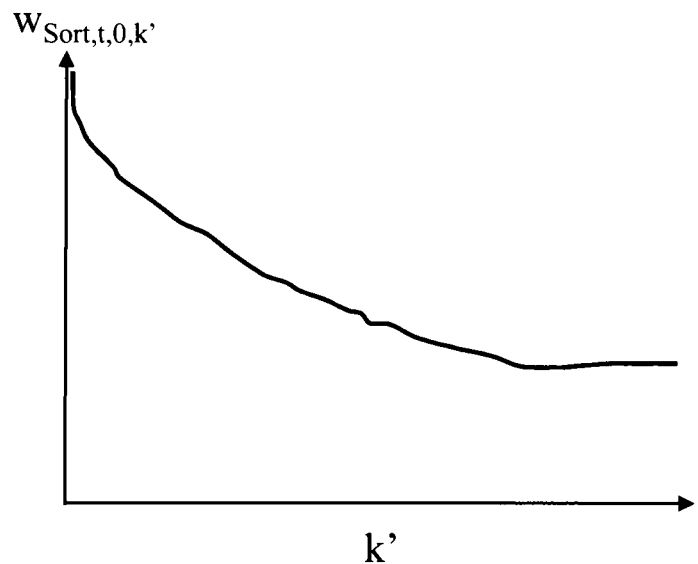
FIG. 8A shows the distribution of sorted output probabilities $w_{Sort,t,0,k}$ of Gaussian distributions k of a non-speech GMM.
Figure 8B:
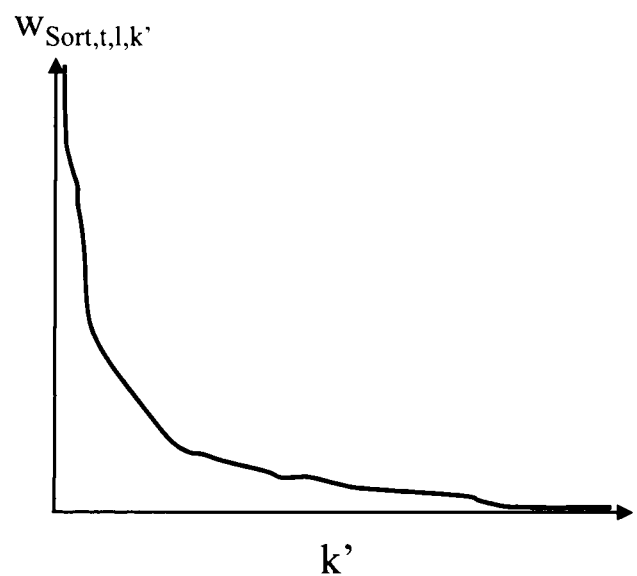
FIG. 8B shows the distribution of sorted output probabilities $w_{Sort,t,1,k}$ of a speech GMM.

If the acoustic signal in frame t is a non-speech signal (j=0), the fluctuation of the sorted output probabilities w$_{Sort,t,0,k'}$ of the Gaussian distributions k of the non-speech GMM with respect to k' is small. This is shown in FIG. 8A. The horizontal axis of FIG. 8A indicates the index k' of the Gaussian distribution, and the vertical axis indicates the sorted output probability w$_{Sort,t,0,k'}$. The characteristic is a gradual decline with increase in index k', as shown in the figure. On the other hand, the fluctuation of the sorted output probabilities w$_{Sort,t,1,k'}$ of the speech GMM with respect to k' is large, and the characteristic is a steep change, as shown in FIG. 8B. That is, if the speech signal in frame t is a non-speech signal, the fluctuation of the output probabilities of the K Gaussian distributions of the non-speech GMM is small, and the fluctuation of the output probabilities of the K Gaussian distributions of the speech GMM is large. This means that, before sorting, the distribution of the output probabilities of the non-speech GMM is small, and the distribution of the output probabilities of the speech GMM is large. If the acoustic signal in frame t is a speech signal (j=1), this relationship is reversed.

Next, in kurtosis calculation processing in step S1161, kurtosis (fourth-order statistic), which is a parameter indicating the peakedness of the distribution, is used to express the characteristic of change of the output probabilities. The kurtosis Kurt$_{t,j}$ of sorted output probabilities w$_{Sort,t,j,k'}$ can be calculated as given by Expression (20).

$$Kurt_{t,j} = \frac{\sum_{k'=1}^{K}(w_{Sort,t,j,k'} - \mu_{w,t,j})^4}{K \cdot (\sum_{w,t,j})^2} \tag{20}$$

$$\mu_{w,t,j} = \frac{1}{K}\sum_{k'=1}^{K} w_{Sort,t,j,k'} \tag{21}$$

$$\sum_{w,t,j} = \frac{1}{K}\sum_{k'=1}^{K}(w_{Sort,t,j,k'} - \mu_{w,t,j})^2 \tag{22}$$

The value of kurtosis Kurt$_{t,j}$ increases as the peakedness of the distribution increases (FIG. 8). Expression (21) represents the mean of the output probabilities w$_{Sort,t,j,k'}$ of all the Gaussian distributions after sorting, and this value equals the mean before sorting. The numerator in Expression (20) is obtained by adding the fourth power of the difference between each output probability w$_{Sort,t,j,k'}$ after sorting and the mean, with respect to all the output probabilities, and this value also equals the sum of biquadrates of the corresponding difference before sorting. Likewise, the mean of the sum of squares represented by Expression (22), which is variance, equals the corresponding value before sorting. In other words, kurtosis Kurt$_{t,j}$ obtained by Expression (20) indicates the distribution of the output probabilities of all the Gaussian distributions before or after sorting. The distribution of the output probabilities is not necessarily defined by Expression (20), and the definition can be made in various ways, on the basis of the sum of squares of the difference between each output probability and the mean of the output probabilities. The probability weight calculation processor 116 should give a great weight to Gaussian distributions that provide a gradual characteristic with a small peakedness; therefore, in weight normalization processing in step S1162, a probability weight w$_{Kurt,t,j}$, which is a normalized reciprocal of kurtosis Kurt$_{t,j}$, is obtained as given by Expression (23) (step S1162).

$$w_{Kurt,t,j} = \frac{\frac{1}{Kurt_{t,j}}}{\frac{1}{Kurt_{t,0}} + \frac{1}{Kurt_{t,1}}} \tag{23}$$

The probability weight calculation processor 116 outputs the probability weight w$_{Kurt,t,j}$, the sorted output probability w$_{Sort,t,j,k'}$, and the corresponding Gaussian distribution index SortIdx$_{t,j,k'}$ to the dominant distribution determination processor 117.

Figure 9:
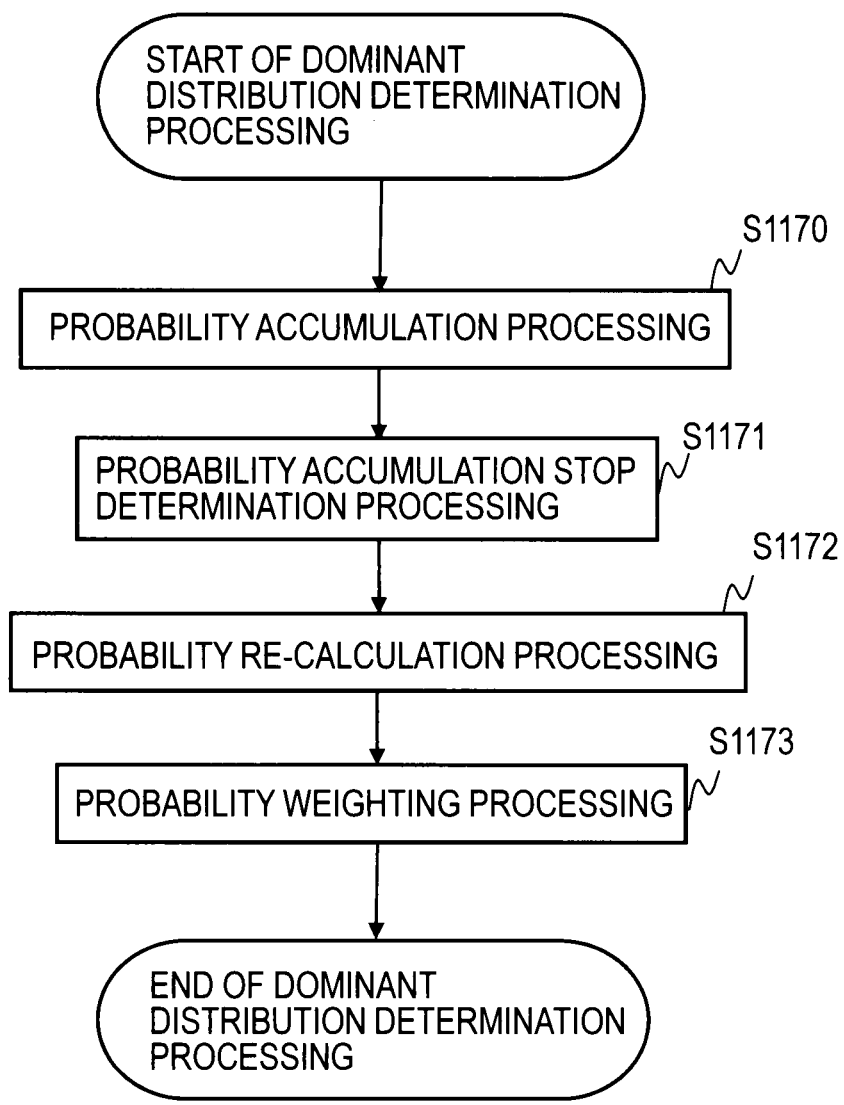
FIG. 9 is a view showing the operation flow of a dominant distribution determination processor 117.

The dominant distribution determination processor 117 prunes Gaussian distributions having extremely small value of the sorted output probability w$_{Sort,t,j,k'}$ and extracts Gaussian distributions having sufficiently large value. The flow of processing is shown in FIG. 9. First, the output probabilities w$_{Sort,t,j,k'}$ sorted in descending order are added successively to obtain a cumulative value (step S1170). The corresponding distribution index number R$_{t,j}$ of the minimum sorted output probability with which the cumulative value reaches a given value 0<X≤1 is obtained as derived by Expression (24).

$$R_{t,j} = \operatorname*{argmin}_{r}\left\{\sum_{k'=1}^{r} w_{Sort,t,j,k'} \geq X\right\} \tag{24}$$

For example, if X=0.9, the corresponding distribution indices of sorted output probabilities w$_{Sort,t,j,k'}$ whose cumulative value is 0.9 is determined (step S1171). In the example shown in FIG. 7, since w$_{Sort,t,k,1}$+w$_{Sort,tj,2}$+w$_{Sort,t,j,3}$=0.9≥X, the corresponding distribution indices SortIdx$_{t,j,1}$ to SortIdx$_{t,j,3}$ are selected.

In probability re-calculation processing in step S1172, the selected Gaussian distribution indices SortIdx$_{t,j,1}$ to SortIdx$_{t,j,(Rt,j)}$ are used to re-calculate the output probabilities b$_{1,j}$(O$_t$) of the non-speech GMM and the speech GMM. Before the re-calculation, the mixture weight w$_{j,k}$ (k=SortIdx$_{t,j,k'}$), which is a GMM parameter, is normalized as given by Expression (25).

$$w_{t,j,SortIdx_{t,j,k'}} = \frac{w_{j,SortIdx_{t,j,k'}}}{\sum_{k'=1}^{R_{t,j}} w_{j,SortIdx_{t,j,k'}}} \tag{25}$$

By using the normalized mixture weight and the output probability b$_{1,j,k}$(O$_t$) (SortIdx$_{t,j,k'}$ assigned to k) of each Gaussian distribution k obtained by the output probability calculation processor 115, the output probabilities b$_{1,j}$(O$_t$) of the non-speech GMM and the speech GMM are re-calculated as given by Expression (26). The sorted output probabilities $w_{Sort,t,j,k'}$ are re-calculated as given by Expression (27).

$$b_{1,j}(O_t) = \sum_{k'=1}^{R_{t,j}} w_{t,j,SortIdx_{t,j,k'}} b_{1,j,SortIdx_{t,j,k'}}(O_t) \quad (26)$$

$$w_{Sort,t,j,k'} = \frac{w_{t,j,SortIdx_{t,j,k'}} b_{1,j,SortIdx_{t,j,k'}}(O_t)}{b_{1,j}(O_t)} \quad (27)$$

Next, the re-calculated output probabilities $b_{1,j}(O_t)$ are weighted by using the probability weight $w_{Kurt,t,j}$ as given by Expression (28) in step S1173.

$$b_{w,1,j}(O_t) = w_{Kurt,t,j} \cdot b_{1,j}(O_t) \quad (28)$$

By using the probability weight $w_{Kurt,t,j}$ obtained by the probability weight calculation processor 116, the difference between the output probability of the non-speech GMM and the output probability of the speech GMM can be emphasized, and discrimination between non-speech and speech can be improved.

By obtaining the weighted averages of the Gaussian distribution parameters $\hat{N}_{t,j,k,l}$ and $\hat{\Sigma}_{N,t,j,k,l}$ updated by the parameter update processor 113 by using the sorted output probabilities $w_{Sort,t,k,k'}$ obtained by the probability weight calculation processor 116, the first weighted average processor 118 obtains the results $\hat{N}_{t,j,1}$ and $\hat{\Sigma}_{N,t,j,1}$ of noise parameter estimation corresponding to the non-speech GMM and the speech GMM. The weighted average is derived by the following expression.

$$\hat{N}_{t,j,l} = \sum_{k'=1}^{R_{t,j}} w_{Sort,t,j,k'} \hat{N}_{t,j,SortIdx_{t,j,k'},l} \quad (29)$$

$$\hat{\sum}_{N,t,j,l} = \sum_{k'=1}^{R_{t,j}} w_{Sort,t,j,k'} \hat{\sum}_{N,t,j,SortIdx_{t,j,k'},l} \quad (30)$$

Next, the second weighted average processor 119 obtains the weighted averages of the results $\hat{N}_{t,j,1}$ and $\hat{\Sigma}_{N,t,j,1}$ of noise parameter estimation obtained by the first weighted average processor 118, by using the output probabilities $b_{w,1,j}(O_t)$ re-calculated by the dominant distribution determination processor 117, as given by Expressions (31) and (32) respectively. By obtaining the weighted averages, the results $\hat{N}_{t,1}$ and $\hat{\Sigma}_{N,t,1}$ of noise parameter estimation in frame t are obtained and used for noise parameter estimation of the following frame.

$$\hat{N}_{t,l} = \frac{b_{w,1,0}(O_t)}{b_{w,1,0}(O_t) + b_{w,1,1}(O_t)} \hat{N}_{t,0,l} + \frac{b_{w,1,1}(O_t)}{b_{w,1,0}(O_t) + b_{w,1,1}(O_t)} \hat{N}_{t,1,l} \quad (31)$$

$$\hat{\sum}_{N,t,l} = \frac{b_{w,1,0}(O_t)}{b_{w,1,0}(O_t) + b_{w,1,1}(O_t)} \hat{\sum}_{N,t,0,l} + \frac{b_{w,1,1}(O_t)}{b_{w,1,0}(O_t) + b_{w,1,1}(O_t)} \hat{\sum}_{N,t,1,l} \quad (32)$$

The results $\hat{N}_{t,1}$ and $\hat{\Sigma}_{N,t,1}$ of noise parameter estimation obtained by the second weighted average processor 119 are stored in the noise probabilistic model estimation buffer 931.

By performing the processing described above, the probabilistic model parameter estimation and probability calculation unit 11 outputs speech and non-speech probabilities $b_{w,1,0}(O_t)$ and $b_{w,1,1}(O_t)$ in frame t as output parameters of the acoustic signal analyzer 10 to the speech state probability to non-speech state probability ratio calculator 95.

Speech State Probability to Non-Speech State Probability Ratio Calculator 95

Figure 10:
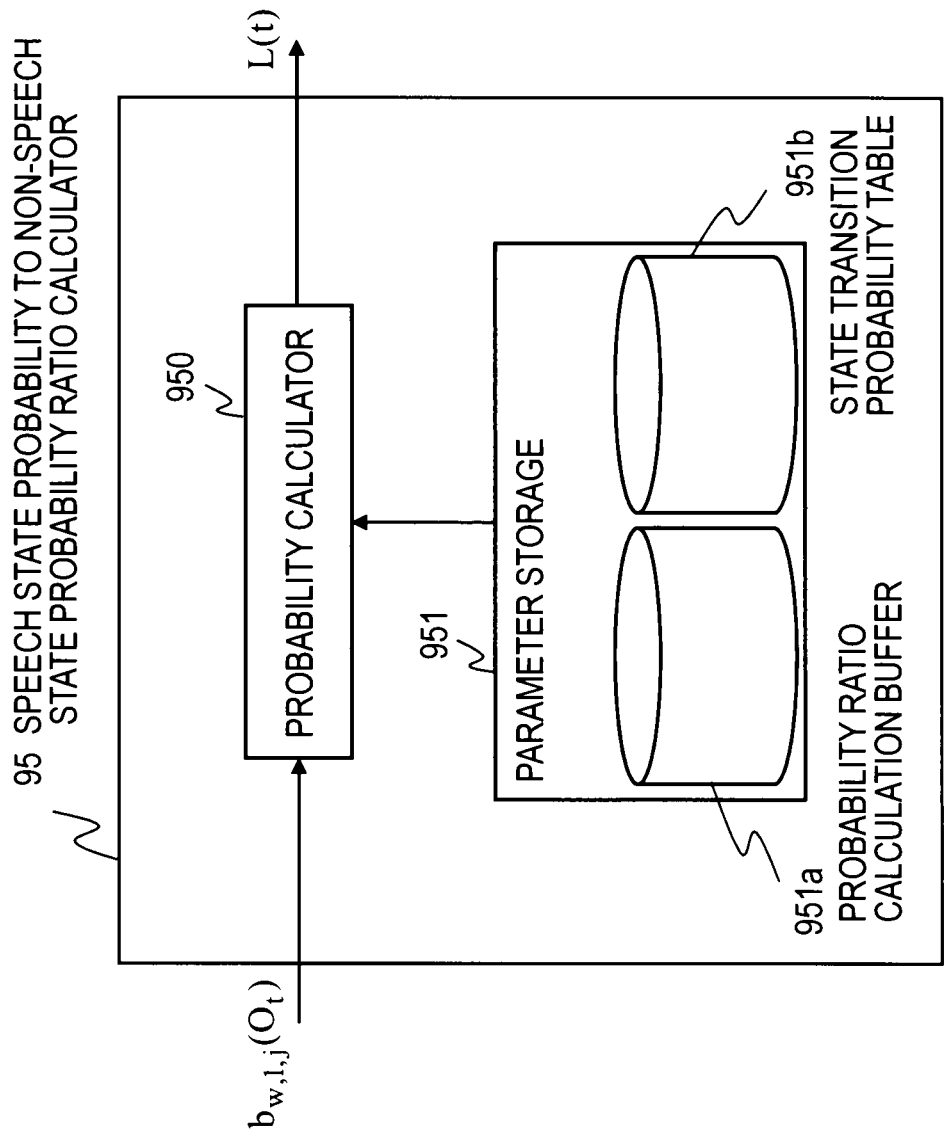
FIG. 10 is a view showing an example functional configuration of a speech state probability to non-speech state probability ratio calculator 95.

FIG. 10 shows an example functional configuration of the speech state probability to non-speech state probability ratio calculator 95. The speech state probability to non-speech state probability ratio calculator 95 includes a probability calculator 950 and a parameter storage 951.

Figure 11:
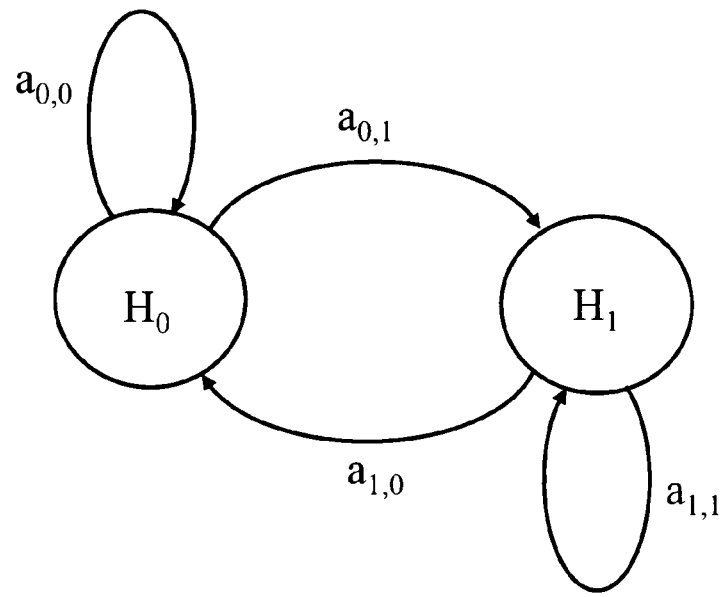
FIG. 11 is a view showing a state transition model of a speech state and a non-speech state.

The speech state probability to non-speech state probability ratio calculator 95 receives speech and non-speech probabilities $b_{w,1,0}(O_t)$ and $b_{w,1,1}(O_t)$ and calculates the speech state probability to non-speech state probability ratio based on the state transition model of the speech state and the non-speech state, expressed by the finite state machine in FIG. 11. The finite state machine indicates the state transition model of the speech state and the non-speech state and includes a non-speech state $H_0$, a speech state $H_1$, and state transition probabilities $a_{i,j}$ (i=0 or 1, j=0 or 1), where i is the state number of the present state and j is the state number of the destination state.

The parameter storage 951 includes a probability ratio calculation buffer 951a and a state transition probability table 951b. The state transition probability table 951b holds values of the state transition probabilities $a_{i,j}$ (i=0 or 1, j=0 or 1) for the non-speech state $H_0$ and the speech state $H_1$. The state number 0 represents the non-speech state, and the state number 1 represents the speech state, and the state transition probabilities $a_{i,j}$ satisfy $a_{i,0} + a_{i,1} = 1$.

When the signal state in frame t is defined as $q_t = H_j$, the probability calculator 950 calculates the ratio L(t) of speech state probability to non-speech state probability as given by Expression (33).

$$L(t) = \frac{p(q_t = H_1 \mid O_{0:t})}{p(q_t = H_0 \mid O_{0:t})} \quad (33)$$

Here, $O_{0:t} = \{O_0, \ldots, O_t\}$, and the probability ratio L(t) is expanded as given below, based on Bayes' theorem.

$$L(t) = \frac{p(q_t = H_1 \mid O_{0:t})}{p(q_t = H_0 \mid O_{0:t})} = \frac{p(O_{0:t}, q_t = H_1)}{p(O_{0:t}, q_t = H_0)} \quad (34)$$

If the state transition of a noise signal $N_{0:1} = \{N_0, \ldots, N_t\}$ in time is considered, Expression (34) is expanded into Expansion (35).

$$L(t) = \frac{p(q_t = H_1 \mid O_{0:t}, N_{0:t})}{p(q_t = H_0 \mid O_{0:t}, N_{0:t})} = \frac{p(O_{0:t}, q_t = H_1, N_{0:t})}{p(O_{0:t}, q_t = H_0, N_{0:t})} \quad (35)$$

Expression (35) is expanded into the following recursive formula (first order Markov chain) with the past frame state taken into consideration.

$$p(O_{0:t}, q_t, N_{0:t}) = \quad (36)$$
$$\sum_{q_{t-1}} p(q_t \mid q_{t-1}) p(O_{0:t} \mid q_t, N_t) p(N_t \mid N_{t-1}) p(O_{0:t-1}, q_{t-1}, N_{0:t-1})$$

Here, $p(q_t = H_j \mid q_{t-1} = H_i) = \alpha_{i,j}$, $p(O_t \mid q_t = H_j, N_s) = b_{w,1,j}(O_t)$, and $p(N_t \mid N_{t-1}) = 1$, and the probability $p(O_t, q_t = H_j, N_t)$ corresponds to a forward probability $\alpha_{t,j}$ calculated in the direction of time. Expression (36) is obtained by the following recursive formula $$\alpha_{t,j} = (\alpha_{t-1,0}a_{0,j} + \alpha_{t-1,1}a_{1,j})b_{w,1,j}(O_t) \qquad (37)$$

Consequently, the speech state probability to non-speech state probability ratio L(t) is calculated in Expression (38).

$$L(t) = \frac{\alpha_{t,1}}{\alpha_{t,0}} \qquad (38)$$

Figure 12:
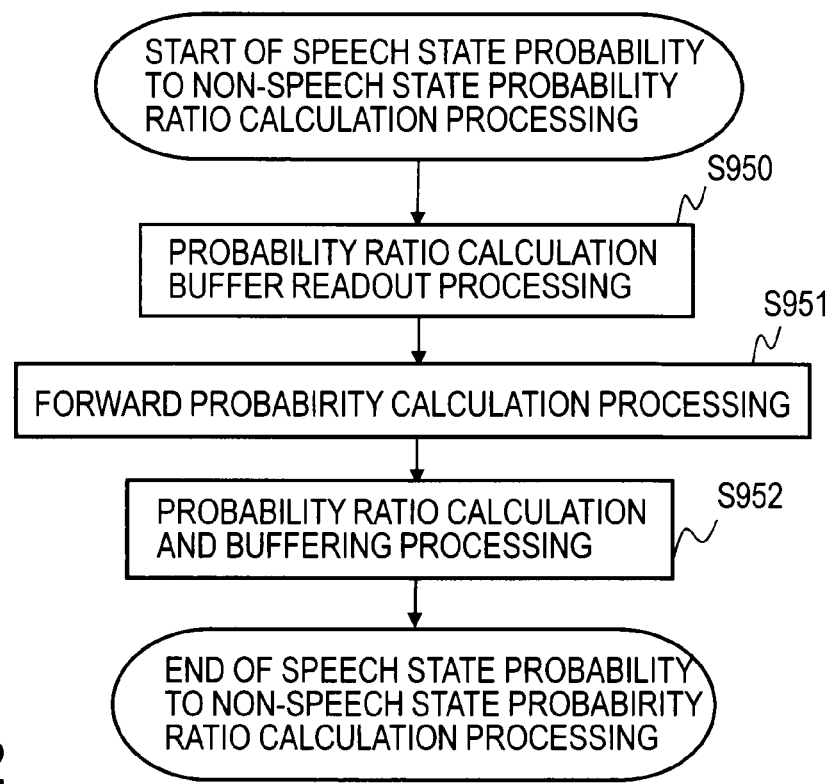
FIG. 12 is a view showing the operation flow of the speech state probability to non-speech state probability ratio calculator 95.

The processing flow of the speech state probability to non-speech state probability ratio calculator 95 is shown in FIG. 12. The forward probability $\alpha_{t,j}$ is calculated by following that operation flow.

First in the read-out processing of the probability ratio calculation buffer 951a, the forward probability $\alpha_{t-1,j}$ of frame t−1 is output from the probability ratio calculation buffer 951a (step S950). If t=0, the forward probability $\alpha_{t,j}$ is set as $\alpha_{t,0}$=1 and $\alpha_{t,1}$ 0.

Next, the probability calculator 950 extracts the state transition probability $a_{i,j}$ from the state transition probability table 951b and calculates the forward probability $\alpha_{t,j}$ of frame t as given by Expression (37) (step S951). The probability calculator 950 further calculates the probability ratio L(t) as given by expression (38) and stores the forward probability $\alpha_{t,j}$ in the probability ratio calculation buffer 951a (step S952).

Voice Activity Detection Unit 96

Figure 13:
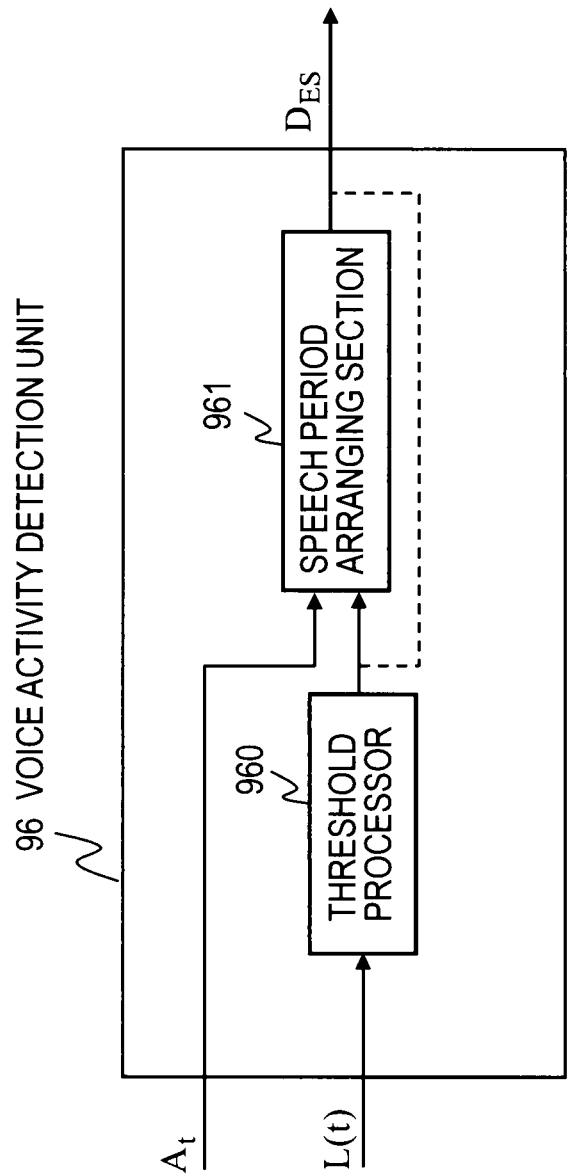
FIG. 13 is a view showing an example functional configuration of a voice activity detection unit 96.

FIG. 13 shows an example functional configuration of the voice activity detection unit 96. The voice activity detection unit 96 includes a threshold processor 960 and a speech period arranging section 961 and receives the speech state probability to non-speech state probability ratio L(t) and judges whether the acoustic signal $A_t$ in frame t is in the speech state or the non-speech state.

If the value of the speech state probability to non-speech state probability ratio L(t) is greater than or equal to a separately specified threshold TH, the threshold processor 960 judges that frame t is in the speech state and outputs 1. If the ratio L(t) is smaller than the threshold TH, the threshold processor 960 judges that frame t is in the non-speech state, and outputs 0. The value of the threshold TH may be set to a predetermined fixed value or may be set adaptively based on the characteristic of the acoustic signal.

The speech period arranging section 961 corrects an error by arranging the results of speech period obtained in the threshold processor 960. In the error correction, if a given number of consecutive frames, such as five or more consecutive frames, for example, are determined to be speech by the threshold processor 960, the corresponding period is determined to be a speech period. If a given number of consecutive frames are determined to be non-speech, the corresponding period is determined to be a non-speech period. It is desirable that these given numbers of consecutive frames can be set to desired numbers by using variables, such as Sduration for speech period detection and Nduration for non-speech period detection.

If a short non-speech period is detected in a speech period and if the duration of the non-speech period is up to a predetermined number of Pause frames, the corresponding period may be considered as the speech period. Since the speech period arranging section 961 does not allow a speech period or a non-speech period of a small number of frames to be generated readily, the signal detection operation can be stabilized. A signal indicating the detected speech period or non-speech period is output as speech detection information $D_{ES}$. If necessary, a combination of the signal indicating the speech period or non-speech period and the acoustic signal $A_t$ may be output as the speech detection information $D_{ES}$. Alternatively, the amplitude of all the samples in the detected non-speech period contained in the acoustic signal $A_t$ may be set to zero, and the result may be output as the speech detection information $D_{ES}$. A detected speech period may be extracted from the acoustic signal and output as the speech detection information $D_{ES}$. As indicated by a broken line, the results estimated by the threshold processor 960 may be directly output as $D_{ES}$, without performing the processing in the speech period arranging section 961.

Second Embodiment

Figure 14:
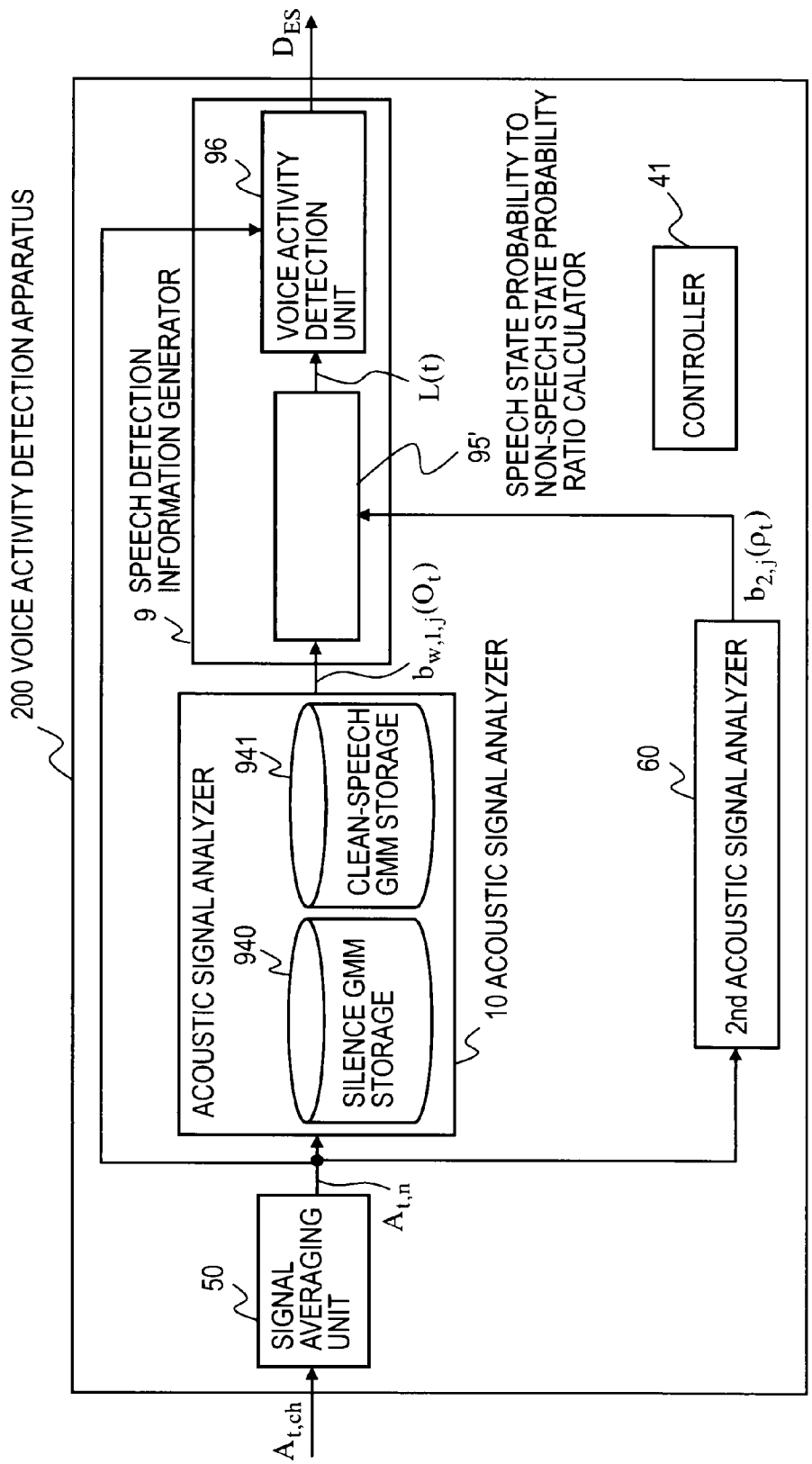
FIG. 14 is a view showing an example functional configuration of a voice activity detection apparatus 200 according to the present invention.

FIG. 14 shows an example functional configuration of a voice activity detection apparatus 200 according to the present invention. The voice activity detection apparatus 200 differs from the voice activity detection apparatus 100 in the following points: A signal averaging unit 50 for averaging digital acoustic signals $A_{t,ch}$ of various channels in each frame and a second acoustic signal analyzer 60 for obtaining a speech probability and a non-speech probability by using a periodic component power and an aperiodic component power are included; and a speech state probability to non-speech state probability ratio calculator 95' in the speech detection information generator 9 calculates the speech state probability to non-speech state probability ratio L(t) by also using the output signal from the second acoustic signal analyzer 60. The corresponding differences in operation will be described next.

Signal Averaging Unit 50

Figure 15:
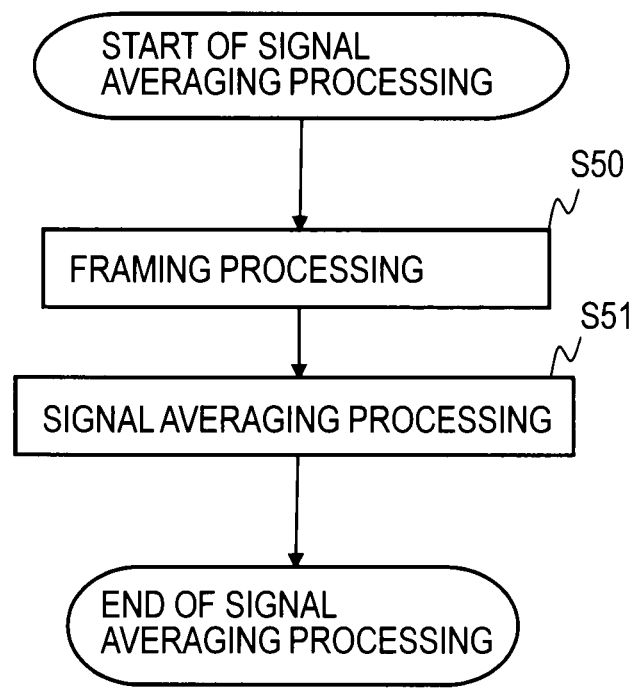
FIG. 15 is a view showing the operation flow of a signal averaging unit 50.

FIG. 15 shows the operation flow of the signal averaging unit 50. The signal averaging unit 50 cuts out an acoustic signal of a given time length, as a frame, from the acoustic signal in each of various channels, while moving the start point by a predetermined duration in the time axis direction. For example, the acoustic signal $A_{t,ch}$ at 200 sample points (25 ms) sampled at a sampling frequency of 8 kHz is cut out in each channel while moving the start point by 80 sample points (10 ms). In that step (step S50), a Hamming window w(n) given by Expression (39) is used for framing the acoustic signal.

$$w(n) = 0.54 - 0.46 \cdot \cos\frac{2\pi n}{Len - 1} \qquad (39)$$

Here, n is a sample number n=0, 1, . . . , Len−1 in the frame, and Len represents the number of sample points in the cut-out waveform in the frame. For example, Len=200. ch represents a channel number, ch =1, . . . , CH.

The acoustic signals $A_{t,ch,n}$ are averaged out for each sample n, as given by Expression (40), and an averaged signal $A_{t,n}$ which is a monaural signal, is output (step S51).

$$A_{t,n} = \frac{1}{CH}\sum_{ch=1}^{CH} A_{t,ch,n} \qquad (40)$$

If a monaural acoustic signal is input, that is, if CH=1, the signal averaging processing (step S502) may be omitted. With the signal averaging unit 50, memory usage in the processing of multi-channel input acoustic signals can be reduced greatly.

In the signal averaging unit 50, instead of input acoustic signal averaging as given by Expression (40), averaging processing may be performed on the power spectrum domain, by performing a Fourier transform to calculate a power spectrum of the input acoustic signal in each channel, and the mean power spectrum of each channel may be output.

Second Acoustic Signal Analyzer 60

Figure 16:
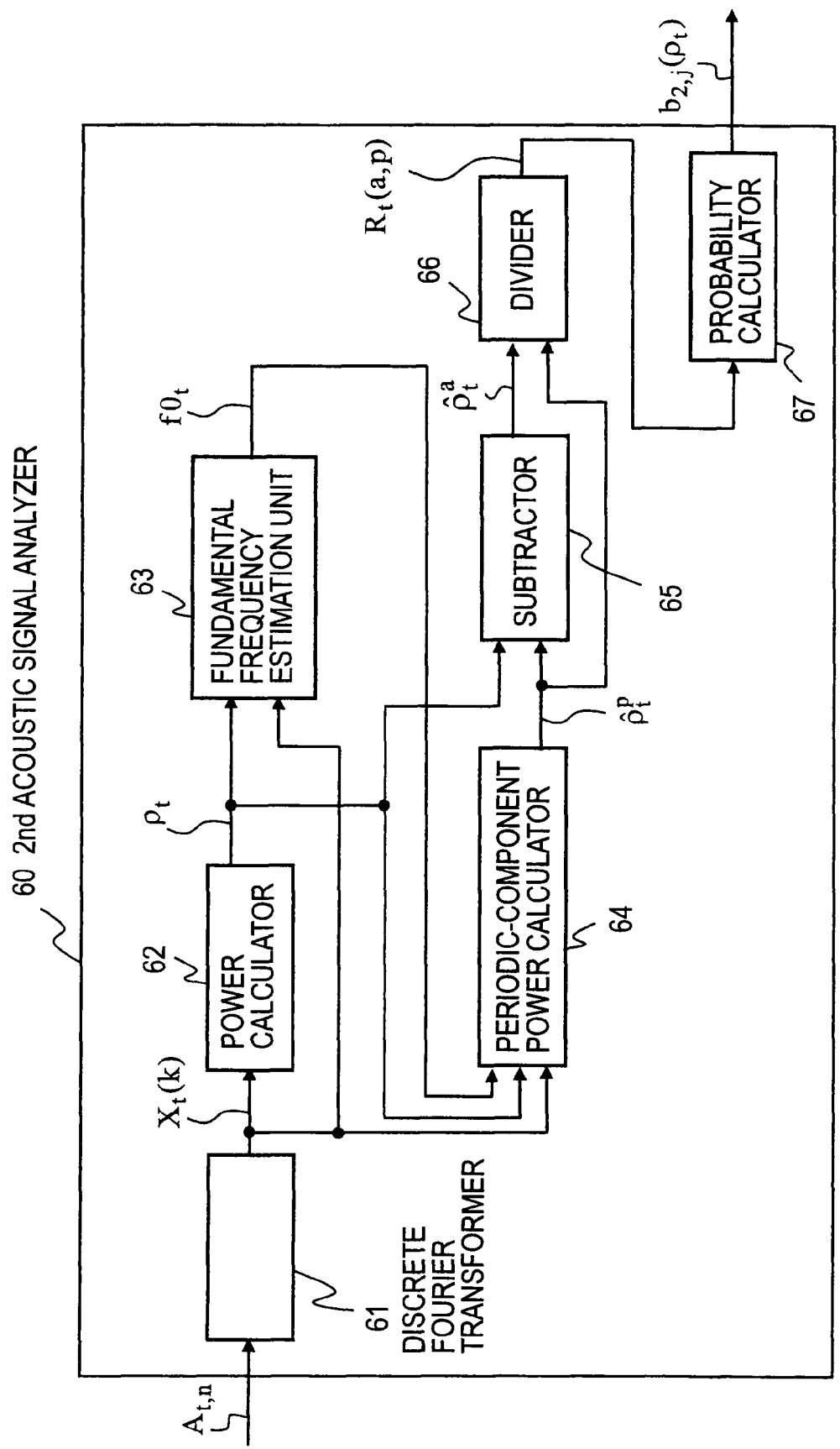
FIG. 16 is a view showing an example functional configuration of a second acoustic signal analyzer 60.
Figure 17:
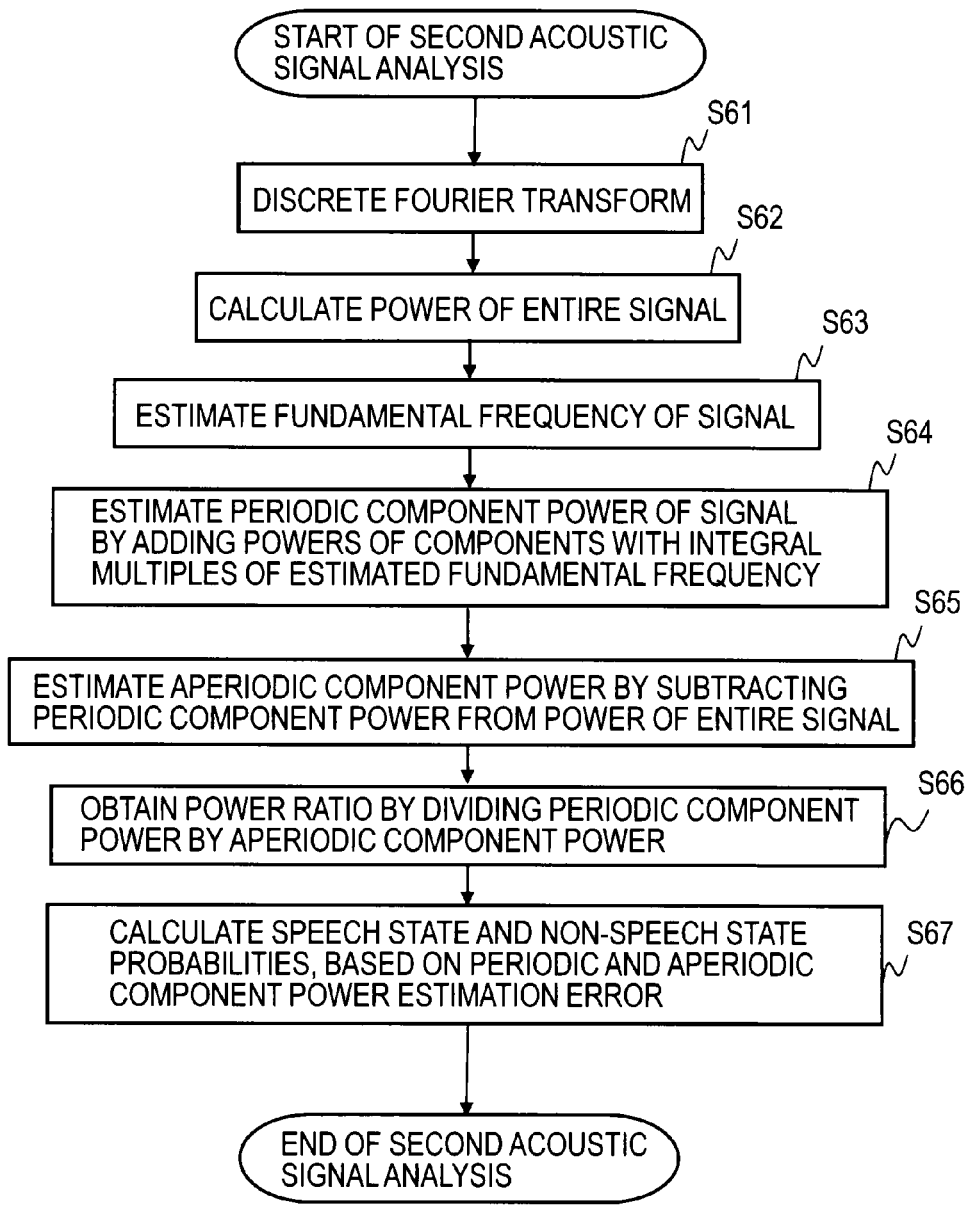
FIG. 17 is a view showing the operation flow of the second acoustic signal analyzer 60.

FIG. 16 shows an example functional configuration of the second acoustic signal analyzer 60. The operation flow is shown in FIG. 17. The second acoustic signal analyzer 60 includes a discrete Fourier transformer 61, a power calculator 62, a fundamental frequency estimation unit 63, a periodic-component power calculator 64, a subtractor 65, a divider 66, and a probability calculator 67.

The discrete Fourier transformer 61 performs a discrete Fourier transform of the averaged signal $A_{t,n}$ to transform the averaged signal in the time domain to the frequency domain (step S61). The complex spectrum $X_t(k)$ of the averaged signal $A_{t,n}$ is given by expression (41).

$$X_t(k) = \sum_{n=0}^{M-1} A_{t,n} \exp\left(-j\frac{2\pi}{M} kn\right) \tag{41}$$

Here, k is a discrete point obtained by dividing the sampling frequency by M, and M is 256, for example.

The power calculator 62 calculates the average power $\rho_t$ of the averaged signal $A_{t,n}$ from the complex spectrum $X_t(k)$ output by the discrete Fourier transformer 61, as given by Expression (42) (step S62).

$$\rho_t = \frac{1}{M} \sum_{k=0}^{M-1} |X_t(k)|^2 \tag{42}$$

The fundamental frequency estimation unit 63 receives the average power $\rho_t$ output from the power calculator 62 and the frequency spectrum $X_t(k)$ output from the discrete Fourier transformer 61 and estimates the fundamental frequency $f0_t$ of the averaged signal $A_{t,n}$ as given by Expression (43) (step S63). Estimation of the fundamental frequency by using the power spectrum is performed by the estimation method described, for example, in the following reference: Nakatani, T. and Irino, T., "Robust and accurate fundamental frequency estimation based on dominant harmonic components," Journal of the Acoustical Society of America, Vol. 116, pp. 3690-3700, 2004.

$$f0_t = \text{argmax}_g \left( \sum_{k=1}^{v_t} |X_t(kg)|^2 - v_t \rho_t \right) \tag{43}$$

Here, $f0_t$ is a bin corresponding to the estimated fundamental frequency in the frequency spectrum; argmax(*) is a function that outputs g that maximizes (*); and $v_t$ is a function expressing the integer part of M/g. Estimation can be performed without using the power spectrum, by the autocorrelation method, for example (reference: Quatieri, T. F., "Discrete-time Speech Signal Processing principles and practice," Prentice-Hall, 2002; pp. 504-505). In the autocorrelation method, an autocorrelation function is obtained first. Letting the number of sample points in the framed waveform be Len, and the amplitude of the signal at the g-th sample point be $x_t(g)$, the coefficient $c_t(g)$ of the autocorrelation function is given by the following expression.

$$c_t(g) = \frac{1}{\text{Len}} \sum_{k=1}^{\text{Len}-1-g} x_t(g) x_t(g+k) \tag{44}$$

The coefficient $c_t(g)$ of the autocorrelation function at g=1, ..., Len is obtained. Then, in a given search range of g in the coefficient of the autocorrelation function, such as 16≤g≤160 corresponding to 50 to 500 Hz at a sampling frequency of 8 kHz, g that maximizes $c_t(g)$ is detected. The detected g represents the period length of the most dominant periodic component in the search range of the input signal and corresponds to the period length if the input signal is a single completely periodic signal, such as a sinusoidal wave.

The periodic-component power calculator 64 receives the complex spectrum $X_t(k)$ output from the discrete Fourier transformer 61, the averaged power $\rho_t$ of the averaged signal $A_{t,n}$ output from the power calculator 62, and the fundamental frequency $f0_t$ output from the fundamental frequency estimation unit 63 and estimates the power $\hat{\rho}^p_t$ of the periodic component of the averaged signal $A_{t,n}$ (step S64).

$$\hat{\rho}^p_t = \eta \frac{\sum_{k=1}^{v_t} |X_t(kf0_t)|^2 - v_t \rho_t}{1 - \eta v_t} \tag{45}$$

$$\eta = \frac{2\sum_{t=0}^{\text{Len}-1} w(n)^2}{\left(\sum_{t=0}^{\text{Len}-1} w(n)\right)^2} \tag{46}$$

Here, $f0_t$ is the bin corresponding to the estimated fundamental frequency in the power spectrum, and $v_t$ is a function expressing the integer part of M/g. The power $\hat{\rho}^p_t$ of the periodic component can be estimated without using the power spectrum. That type of estimation is performed as follows: A comb filter having a frequency characteristic expressed as $H(z)=1-z^{-f0_t}$ in the expression in the z domain using the output of the fundamental frequency estimation unit 63 is formed; the comb filter is applied to the averaged signal to obtain a discrete signal in which the power of the part corresponding to the zero point in the frequency characteristic of the comb filter (fundamental frequency component and its integral-multiple frequency components) is suppressed. Letting $\hat{\rho}^a_t$ be the aperiodic component power of the obtained signal, the power of the periodic component can be estimated by the following expression.

$$\hat{\rho}^p_t = \rho_t - \hat{\rho}^a_t \tag{47}$$

The obtained $\hat{\rho}^p_t$ may be the output of the periodic-component power calculator 64.

The subtractor 65 estimates the power $\hat{\rho}^a_t$ of the aperiodic component, which is other than the periodic component, by subtracting the power $\hat{\rho}^p_t$ of the periodic component output from the periodic-component power calculator 64, from the power $\rho_t$ output from the power calculator 62, as given by Expression (48) (step S65).

$$\hat{\rho}^a_t = \rho_t - \hat{\rho}^p_t \tag{48}$$

In the description given earlier, the periodic component power $\hat{\rho}^p_t$ is obtained first, and the aperiodic component power $\hat{\rho}^a_t$ is obtained next. Since the sum of the periodic component power $\hat{\rho}^p_t$ and the aperiodic component power $\hat{\rho}^a_t$ equals $\hat{\rho}_t$, the aperiodic component power $\hat{\rho}^a_t$, not the periodic component power $\hat{\rho}^p_t$, may be obtained first, and the periodic component power $\hat{\rho}^p_t$ may then be obtained by the subtractor 65.

$$\hat{\rho}^a_t = \frac{\rho_t - \sum_{k=1}^{\nu_t} |X_t(kf0_t)|^2}{1 - \eta\nu_t} \quad (49)$$

$$\hat{\rho}^p_t = \rho_t - \hat{\rho}^a_t \quad (50)$$

The divider 66 receives the periodic component power $\hat{\rho}^p_t$ and the aperiodic component power $\hat{\rho}^a_t$ obtained as described above and outputs the ratio of them as given by Expression (51) (step S66).

$$R_t(a, p) = \frac{\hat{\rho}^p_t}{\hat{\rho}^a_t} \quad (51)$$

The probability calculator 67 receives the ratio output from the divider 66 and calculates the probabilities $b_{2,j}(\rho_t)$ at which the averaged signal belongs to the non-speech state and to the speech state (non-speech probability and speech probability) as given by the following expressions (step S67).

$$b_{2,0}(\rho_t) = C_0 \exp\left\{-\frac{(R_t(a,p))^2}{2}\right\} \quad (52)$$

$$b_{2,1}(\rho_t) = C_1 \exp\left\{-\frac{1}{2(R_t(a,p))^2}\right\} \quad (53)$$

Here, $C_0$ and $C_1$ are constant terms of the Gaussian distribution and are normalization coefficients to bring the values of the integrals of the exp terms to 1.

Speech State Probability to Non-Speech State Probability Ratio Calculator 95'

In the first embodiment, the forward probability $\alpha_{t,j}$ is obtained as given by Expression (37), by using the speech and non-speech probabilities $b_{w,1,j}(O_t)$ output from the acoustic signal analyzer 10, in order to calculate the speech state probability to non-speech state probability ratio L(t) by Expression (38). The speech state probability to non-speech state probability ratio calculator 95' in the second embodiment differs from the speech state probability to non-speech state probability ratio calculator 95 in the first embodiment in that the forward probability $\alpha_{t,j}$ is calculated as given by Expression (54), by using the speech and non-speech probabilities $b_{w,1,j}(O_t)$ output from the acoustic signal analyzer 10, multiplied by the speech and non-speech probabilities $b_{2,j}(\rho_t)$ output from the second acoustic signal analyzer 60, in order to calculate the speech state probability to non-speech state probability ratio L(t) as given by Expression (38). The other operations are the same.

$$\alpha_{t,j} = (\alpha_{t-1,0}a_{0,j} + \alpha_{t-1,1}a_{1,j})b_{w,1,j}(O_t) \cdot b_{2,j}(\rho_t) \quad (54)$$

Unlike the voice activity detection apparatus 100, the voice activity detection apparatus 200 in the second embodiment considers the speech and non-speech probabilities based on the estimation error of the periodic component power and the aperiodic component power as well, so that the accuracy of voice activity detection can be improved.

Third Embodiment

Figure 18:
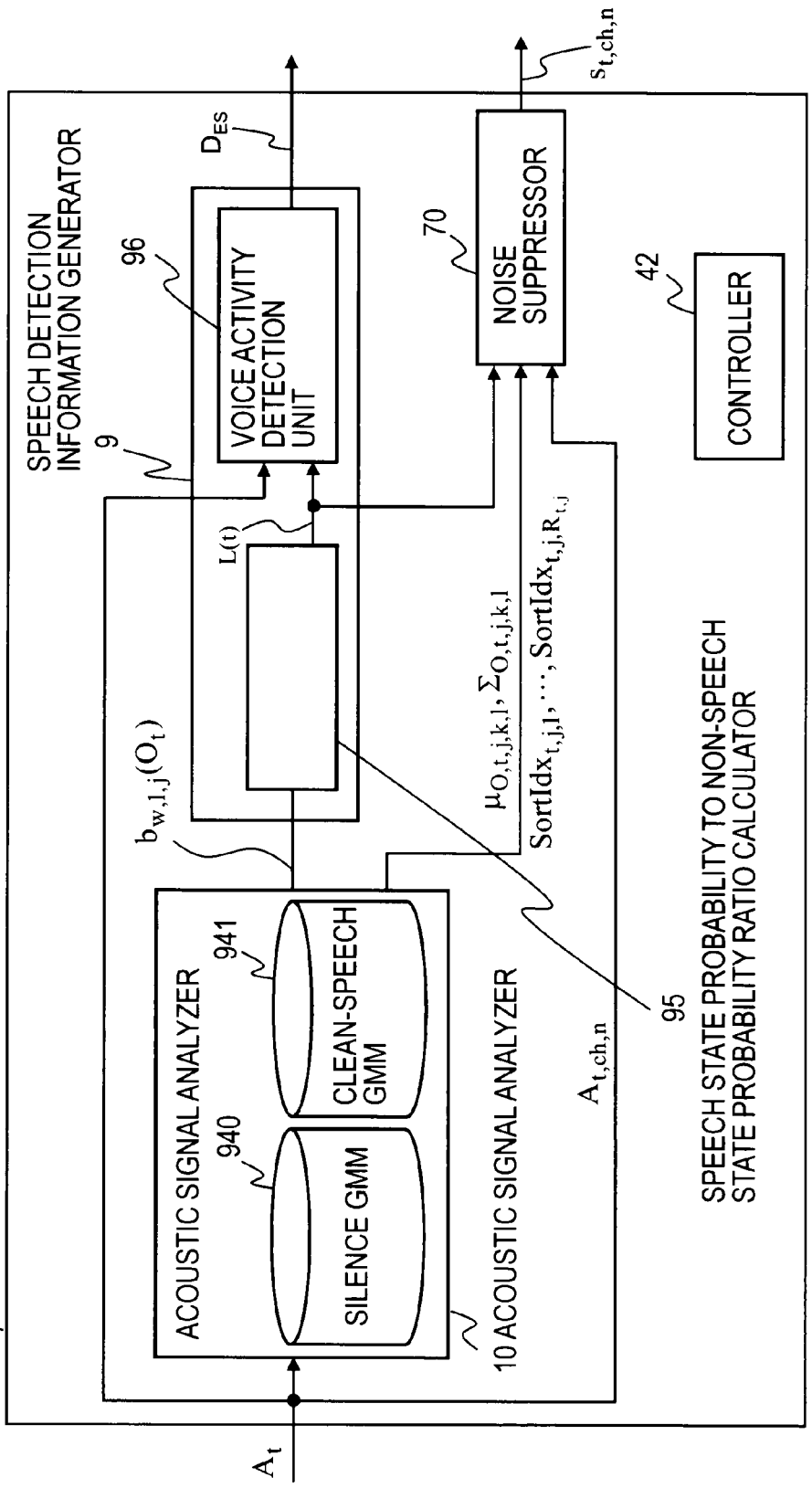
FIG. 18 is a view showing an example functional configuration of a voice activity detection apparatus 300 with a noise suppression function according to the present invention.

FIG. 18 shows an example functional configuration of a voice activity detection apparatus 300 with a noise suppression function according to the present invention. The voice activity detection apparatus 300 with the noise suppression function is formed by adding a noise suppressor 70 to the voice activity detection apparatus 100 to output a speech period information and a noise-suppressed signal obtained by suppressing noise contained in the acoustic signal in the speech period.

The noise suppressor 70 receives the acoustic signal, the speech and non-speech probabilities $b_{w,1,j}(O_t)$ output from the acoustic signal analyzer 10, and the speech state probability to non-speech state probability ratio L(t) output from the speech state probability to non-speech state probability ratio calculator 95 and suppresses noise contained in the acoustic signal $A_t$.

Figure 19:
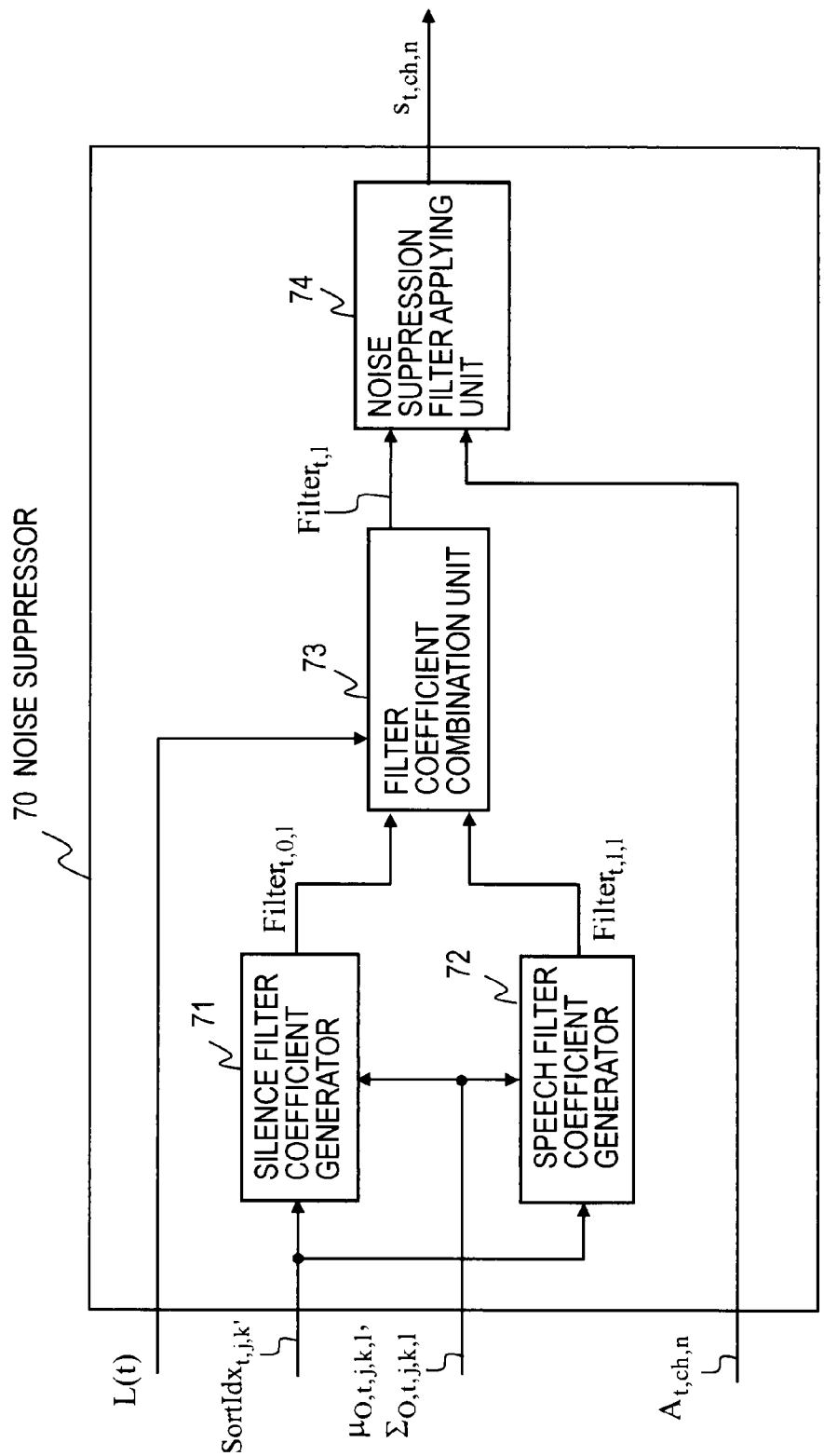
FIG. 19 is a view showing an example functional configuration of a noise suppressor 70.

FIG. 19 shows an example functional configuration of the noise suppressor 70. The noise suppressor 70 includes a silence filter coefficient generator 71, a speech filter coefficient generator 72, a filter coefficient combination unit 73, and a noise suppression filter applying unit 74.

The silence filter coefficient generator 71 and the speech filter coefficient generator 72 generate filter coefficients Filter$_{t,j,1}$ for extracting the silence component and the speech component respectively from the speech and non-speech component GMM parameters $\mu_{O,t,j,k,l}$ and $\Sigma_{O,t,j,k,l}$ adapted to the noise environment in the frame t calculated in the acoustic signal analyzer 10 and the corresponding distribution indices SortIdx$_{t,j,1}$ to SortIdx$_{t,j,(R_{t,j})}$. The corresponding distribution indices are the corresponding distribution indices SortIdx$_{t,j,1}$ to SortIdx$_{t,j,3}$ (here $R_{t,j}=3$) in the example shown in FIG. 7.

$$\text{Filter}_{t,0,1} = (1-\beta) \sum_{k'=1}^{R_{t,0}} \left\{ w_{\text{Sort},t,0,k'} \frac{\exp(\mu_{S,0,\text{SortIdx}_{t,j,k'}}, l)}{\exp(\mu_{O,t,\text{SortIdx}_{t,j,k'}}, l)} \right\} + \beta \quad (55)$$

$$\text{Filter}_{t,1,1} = (1-\beta) \sum_{k'=1}^{R_{t,1}} \left\{ w_{\text{Sort},t,1,k'} \frac{\exp(\mu_{S,0,\text{SortIdx}_{t,j,k'}}, l)}{\exp(\mu_{O,t,1,\text{SortIdx}_{t,j,k'}}, l)} \right\} + \beta \quad (56)$$

In Expressions (55) and (56), $\beta(0 \leq \beta \leq 1)$ is a coefficient for controlling the noise suppression rate. If $\beta=0$, noise is completely suppressed, and if $\beta=1$, noise is not suppressed.

The filter coefficient combination unit 73 receives the speech state probability to non-speech state probability ratio L(t), combines the filter coefficients Filter$_{t,0,1}$ and Filter$_{t,l,1}$ obtained by the silence filter coefficient generator 71 and the speech filter coefficient generator 72, and obtains a final noise suppression filter coefficient Filter$_{t,l}$, as given by the expression below.

$$\text{Filter}_{t,l} = \alpha_{t,0} \cdot \text{Filter}_{t,0,1} + \alpha_{t,1} \cdot \text{Filter}_{t,l,1} \quad (57)$$

Here, $\alpha_{t,0}$ and $\alpha_{t,1}$ are forward probabilities calculated as given by Expression (37), and the speech state probability to non-speech state probability ratio L(t) is given by the following expression with the definition $\alpha_{t,0} + \alpha_{t,1} = 1$.

$$\alpha_{t,0} = \frac{1}{1 + L(t)} \quad (58)$$

$$\alpha_{t,1} = \frac{1}{1 + L(t)} \quad (59)$$

The noise suppression filter applying unit 74 converts the noise suppression filter coefficient Filter$_{t,1}$ obtained by the filter coefficient combination unit 73 to an impulse response coefficient filter$_{t,n}$ as given by the following expression.

$$\text{filter}_{t,n} = \sum_l MelDCT_{l,n} \cdot \text{Filter}_{t,l} \tag{60}$$

Here, MelDCT$_{m,n}$ is a discrete cosine transform (DCT) coefficient weighted by a mel frequency. The method of calculating MelDCT$_{m,n}$ is described in the following reference literature, for example: ETSI ES 202 050 V1.1.4, "Speech Processing, Transmission and Quality Aspects (STQ); Distributed speech recognition; Advanced front-end feature extraction algorithm; Compression algorithms," November 2005, p. 18-p. 19, "5.1.9 Mel IDCT." Therefore, a description thereof is omitted here.

Then, a multi-channel noise suppressed speech $S_{t,ch,n}$ is obtained by convoluting the impulse response filter$_{t,n}$ into the input multi-channel acoustic signal $A_{t,ch,n}$, as given below.

$$s_{t,ch,n} = \sum_m \text{filter}_{t,n-m} \cdot A_{t,ch,m} \tag{61}$$

The noise-suppressed signal $S_{t,ch,n}$ is the output signal from the noise suppressor 70. Although an example of the voice activity detection apparatus 100 with the configuration of the noise suppressor 70 added thereto has been described, a voice activity detection apparatus with a noise suppression function can also be configured by adding the noise suppressor 70 to the voice activity detection apparatus 200.

The voice activity detection apparatus 300 with the noise suppression function is configured by adding the configuration of the noise suppressor 70 to the voice activity detection apparatus 100, but the voice activity detection apparatus with the noise suppression function may also be configured by adding the configuration of the noise suppressor 70 to the voice activity detection apparatus 200.

Experimental Results

An experiment was conducted to evaluate the voice activity detection performance of a voice activity detection apparatus according to the present invention. The experimental conditions were as follows. As the database, CENSREC-1-C designed to evaluate voice activity detection was used. CENSREC-1-C contains two types of data: artificial data and real data collected in a real-world environment. Since the effects of deterioration of speech quality, such as the effects of noise and utterance variation in a real-world environment were examined in this experiment, the real data was used for evaluation. CENSREC-1-C is described in reference: "CENSREC-1-C: Development of evaluation framework for voice activity detection under noisy environment," IPSJ SIG Technical Report, SLP-63-1, pp. 1-6, October 2006.

The real data in CENSREC-1-C was collected in two different environments, a cafeteria and a street, each with two SN ratios (SNRs), a high SNR (sound pressure level of about 60 dB(A)) and a low SNR (sound pressure level of about 70 dB(A)). Here, (A) indicates the measurement characteristic of sound pressure level. A single speech data file contains the speech of a single speaker uttering consecutive one-digit to twelve-digit numbers eight to ten times with intervals of about two seconds. Four files per speaker were collected in each environment. Data for ten speakers (five male and five female) were collected (data for nine of the speakers, excluding one male speaker, were evaluated).

The signals were monaural signals collected by sampling at a frequency of 8 kHz and discrete sampling at a quantization bit rate of 16 bits. For these acoustic signals, the duration of a frame was 25 ms (200 sample points), and the start point of the frame was shifted at intervals of 10 ms (80 sample points) while the acoustic signal analysis processing and the second acoustic signal analysis processing were conducted.

As the GMMs, models each having twelve-dimensional logarithmic mel spectrum as the acoustic feature and having 32 mixture distributions were used. Learning was conducted by using a silence signal and a clean-speech signal. The parameter ε that was used in the parameter prediction processor 112 to obtain predicted values of noise probabilistic model parameters of the current frame was set to 0.001. The threshold X of the dominant distribution determination processor 117 was set to 0.9, and the values of the state transition probabilities $a_{0,0}$, $a_{0,1}$, $a_{1,0}$, and $a_{1,1}$ were set to 0.8. 0.2, 0.9, and 0.1, respectively. The threshold TH of the threshold processor 960 (FIG. 13) of the voice activity detection unit 96 was set to 10, and the noise suppression control coefficient β of the silence filter coefficient generator 71 and the speech filter coefficient generator 72 (FIG. 19) was set to 0.0.

The performance was evaluated by the correct rate of voice activity detection (Correct rate) and the accuracy of voice activity detection (Accuracy), as given by the following expressions.

$$\text{Correct\_rate} = \frac{N_c}{N} \times 100[\%] \tag{62}$$

$$\text{Accuracy} = \frac{N_c - N_f}{N} \times 100[\%] \tag{63}$$

Here, N is the total number of utterance; $N_c$ is the number of correctly detected utterance; and $N_f$ is the number of incorrectly detected utterance. The correct rate of voice activity detection (Correct rate) is a scale for evaluating how many utterances can be detected, and the accuracy of voice activity detection (Accuracy) is a scale for evaluating how appropriately utterances can be detected.

Figure 21:
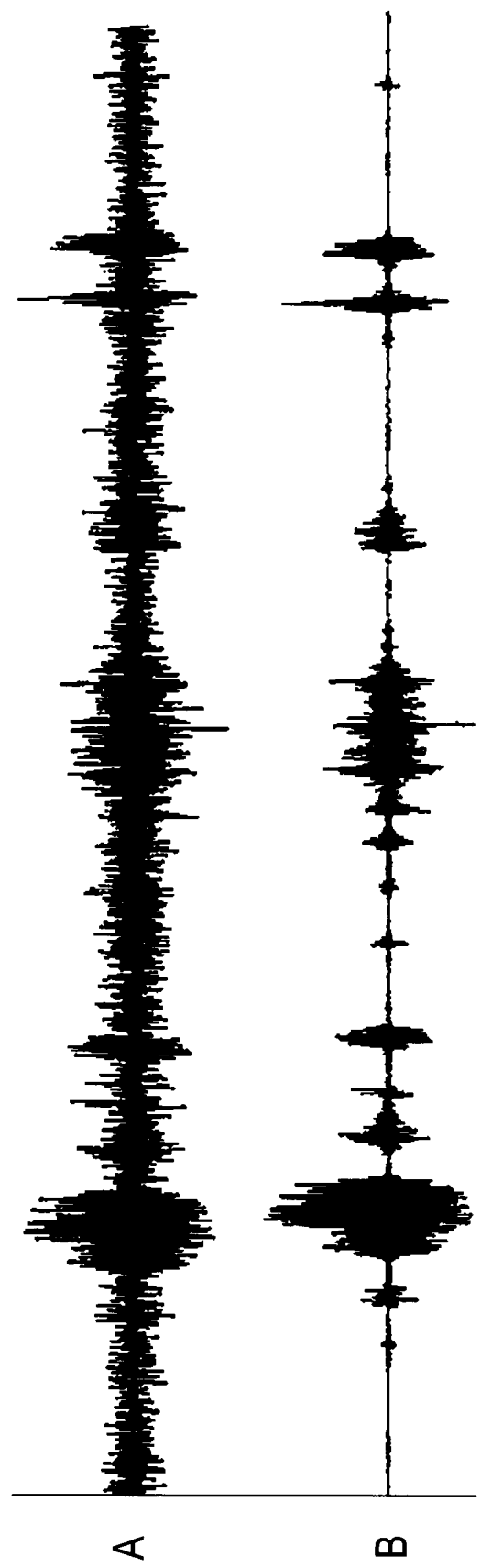
FIG. 21 is a view showing signal waveforms.

FIG. 20 shows the results of evaluation. A1 and A2 in FIG. 20 indicate baselines defined in the CENSREC-1-C database; B1 and B2 in FIG. 20 indicate the results obtained by the method disclosed in non-patent literature 2; and C1 and C2 in FIG. 20 indicate the results according to the present invention. The average correct rate of voice activity detection according to the present invention was 92.03%, which was 1.6% better than 90.43%. In comparison with Non-Patent Literature 2, the average accuracy of voice activity detection was 4.72% better. FIG. 21B shows the waveform of the output noise-suppressed signal obtained by a voice activity detection apparatus according to the present invention. FIG. 21A shows the waveform of the input acoustic signal. They indicate that noise was suppressed effectively by the proposed technique.

As has been described above, the processing time can be reduced by using a method of the present invention, that is, by estimating a speech period just by using probabilistic models of dominant distributions, and discrimination between non-speech and speech can be improved by emphasizing the difference between the non-speech GMM output probability and the speech GMM output probability, with probability weights $w_{Kurt,t,j}$ obtained by the probability weight calculation processor 116.

With the parameter prediction processor 112 in the first embodiment, the method of predicting the parameters of the current frame from the estimated results of the preceding frame by the random walk process has been described, but the autoregressive method (linear prediction method) or the like may be used instead. In that case, the final noise model parameter estimation performance could be improved depending on the order of the autoregressive coefficients. Instead of the models stored in the GMM storage 94, Hidden Markov models (HMMs) or other probabilistic models can be used as the acoustic signal probabilistic models.

The processing described in the above-mentioned method and apparatuses may be executed not only time sequentially in the order described above, but also in parallel or independently depending on necessity or on the processing capability of the apparatus executing the processing.

When the processing units in each of the above-mentioned apparatuses are implemented by a computer, the processing details of the functions to be provided by each apparatus are written as a program. When the program is executed on the computer, the processing units of the apparatus are implemented on the computer.

The program containing the processing details can be recorded in a computer-readable recording medium. The computer-readable recording medium can be any type of medium, such as a magnetic recording device, an optical disc, a magneto-optical recording medium, and a semiconductor memory. For example, a hard disk device, a flexible disk, a magnetic tape, or the like can be used as a magnetic recording device; a digital versatile disc (DVD), a DVD random access memory (DVD-RAM), a compact disc read only memory (CD-ROM), a CD recordable or rewritable (CD-R/RW), or the like can be used as an optical disc; a magneto-optical disc (MO) or the like can be used as a magneto-optical recording medium; and an electronically erasable and programmable read only memory (EEPROM) or the like can be used as a semiconductor memory.

The program is distributed by selling, transferring, or lending a portable recording medium such as a DVD or a CD-ROM with the program recorded on it, for example. The program may also be distributed by storing the program in a storage unit of a server computer and transferring the program from the server computer to another computer through the network.

Each of the processing units may be implemented by executing a predetermined program on a computer. Part of the processing details may also be implemented by hardware.

What is claimed is:

1. A voice activity detection apparatus comprising:
an acoustic signal analyzer that receives a digital acoustic signal containing a speech signal and a noise signal; generates a non-speech Gaussian mixture model, a Gaussian mixture model being hereafter referred to as a GMM, and a speech GMM both adapted to a noise environment, by using a silence GMM and a clean-speech GMM both generated beforehand for each frame of the digital acoustic signal; and calculates non-speech probabilities and speech probabilities of Gaussian distributions left after one or more Gaussian distributions having the smallest output probability are pruned from the GMMs; and
a speech detection information generator that calculates a speech state probability to non-speech state probability ratio based on a state transition model of a speech state and a non-speech state, by using the non-speech probabilities and the speech probabilities, generates information about a speech period based on the calculated probability ratio, and outputs the information as speech detection information,
wherein the acoustic signal analyzer comprises:
an initial noise probabilistic model estimation processor that estimates initial noise probabilistic model parameters;
a parameter prediction processor that predicts noise probabilistic model parameters of the current frame from estimated noise probabilistic model parameters of a preceding frame by a random walk process;
a parameter update processor that receives the noise probabilistic model parameters of the current frame and updates parameters of all Gaussian distributions contained in the silence GMM and the clean-speech GMM;
a probabilistic model parameter generation and estimation processor that generates a non-speech GMM and a speech GMM adapted to the noise environment in the current frame by using the updated parameters of the Gaussian distributions and parameters of various Gaussian distributions of the silence GMM and the clean-speech GMM;
an output probability calculation processor that calculates the output probability of each Gaussian distribution contained in the generated GMMs;
a probability weight calculation processor that calculates probability weights used for weighting the output probabilities of the Gaussian distributions in the non-speech state and the speech state, by parameterizing the distribution of the output probabilities of the Gaussian distributions with a higher-order statistic;
a dominant distribution determination processor that prunes Gaussian distributions having an extremely small output probability and extracts only Gaussian distributions having a sufficiently large output probability;
a first weighted average processor that obtains a weighted average of the noise probabilistic model parameters of the current frame predicted by the parameter prediction processor, by using the probability weights calculated by the probability weight calculation processor; and
a second weighted average processor that obtains a weighted average of noise probabilistic model parameters subjected to weighted averaging by the first weighted average processor, only for the Gaussian distributions extracted by the dominant distribution determination processor.

2. The voice activity detection apparatus according to claim 1, wherein the acoustic signal analyzer comprises a probability weight calculation processor that calculates the degrees of scatter of the non-speech probabilities and the speech probabilities and calculates probability weights used for correcting the non-speech probabilities and the speech probabilities such that the output probabilities of the Gaussian distributions increase as the degrees of scatter decrease.

3. The voice activity detection apparatus according to claim 1, wherein the acoustic signal analyzer comprises a dominant distribution determination processor that calculates a cumulative sum of the output probabilities in descending order and determines a Gaussian distribution whose output probability gives a cumulative sum exceeding a predetermined level, as the one or more Gaussian distributions having the smallest output probability to be pruned.

4. The voice activity detection apparatus according to claim 1, further comprising:
a signal averaging unit that averages out the digital acoustic signals of various channels in each frame; and a second acoustic signal analyzer that obtains a speech probability and a non-speech probability by using a periodic component power and an aperiodic component power;

wherein the speech detection information generator multiplies a speech probability and a non-speech probability calculated by the acoustic signal analyzer by the speech probability and the non-speech probability obtained by the second acoustic signal analyzer respectively, and calculates the speech state probability to non-speech state probability ratio by using the results of multiplication.

5. The voice activity detection apparatus according to one of claims 1, 2, 3, and 4, wherein the speech detection information generator comprises:

a speech state probability to non-speech state probability ratio calculator that calculates the speech state probability to non-speech state probability ratio; and a voice activity detection unit that judges, from the speech state probability to non-speech state probability ratio, whether the acoustic signal of the frame is in the speech state or in the non-speech state and generates the speech detection information based on the judgment result.

6. The voice activity detection apparatus according to one of claims 1, 2, 3, and 4, further comprising a noise suppressor that receives the probability ratio calculated by the speech detection information generator and the output probabilities calculated by the acoustic signal analyzer, generates a noise suppression filter, and suppresses noise in the digital acoustic signal.

7. A voice activity detection method comprising:

an acoustic signal analysis step that receives a digital acoustic signal containing a speech signal and a noise signal; generates probabilistic models of a non-speech Gaussian mixture model, a Gaussian mixture model being hereafter referred to as a GMM, and a speech GMM both adapted to a noise environment, by using a silence GMM and a clean-speech GMM both generated beforehand for each frame of the digital acoustic signal; and calculates non-speech probabilities and speech probabilities of Gaussian distributions left after one or more Gaussian distributions having the smallest output probability are pruned from the GMMs; and a speech detection information generation step that calculates a probability ratio based on a state transition model of a speech state and a non-speech, by using the non-speech probabilities and the speech probabilities, generates information about a speech period based on the calculated probability ratio, and outputs the information as speech detection information, wherein the acoustic signal analysis step comprises:

an initial noise probabilistic model estimation step of estimating initial noise probabilistic model parameters;

a parameter prediction step of predicting noise probabilistic model parameters of the current frame from estimated noise probabilistic model parameters of a preceding frame by a random walk process;

a parameter update step of receiving the noise probabilistic model parameters of the current frame and updating parameters of all Gaussian distributions contained in the silence GMM and clean-speech GMM;

a probabilistic model parameter generation and estimation step of generating a non-speech GMM and a speech GMM adapted to the noise environment in the current frame by using the updated parameters of the Gaussian distributions and parameters of various Gaussian distributions of the silence GMM and clean-speech GMM;

an output probability calculation step of calculating the output probability of each Gaussian distribution contained in the generated GMMs;

a probability weight calculation step of calculating probability weights used for weighting the output probabilities of Gaussian distributions in the non-speech state and the speech state, by parameterizing the distribution of the output probabilities of Gaussian distributions with a higher-order statistic;

a dominant distribution determination step of eliminating Gaussian distributions having an extremely small output probability and extracting only Gaussian distributions having a sufficiently large output probability;

a first weighted averaging step of obtaining a weighted average of the noise probabilistic model parameters of the current frame predicted in the parameter prediction step, by using the probability weights calculated by a probability weight calculation processor; and a second weighted averaging step of obtaining a weighted average of noise probabilistic model parameters subjected to weighted averaging in a first weighted average processor, only for the Gaussian distributions extracted in the dominant distribution determination processor.

8. The voice activity detection method according to claim 7, wherein the acoustic signal analysis step comprises a step of calculating the degrees of scatter of the non-speech probabilities and the speech probabilities and correcting the non-speech probabilities and the speech probabilities such that the output probabilities of the Gaussian distributions increase as the degrees of scatter decrease.

9. The voice activity detection method according to claim 7, wherein the acoustic signal analysis step comprises a step of calculating a cumulative sum of the output probabilities in descending order and determining a Gaussian distribution whose output probability gives a cumulative sum exceeding a predetermined level, as the one or more Gaussian distributions having the smallest output probability to be pruned.

10. The voice activity detection method according to claim 7, further comprising:

a signal averaging step of averaging out the digital acoustic signals of various channels in each frame in a signal averaging unit; and a second acoustic signal analysis step of obtaining a speech probability and a non-speech probability by using a periodic component power and an aperiodic component power;

wherein the speech detection information generation step multiplies a speech probability and a non-speech probability calculated in the acoustic signal analysis step by the speech probability and the non-speech probability obtained in the second acoustic signal analysis step respectively, and calculates the speech state probability to non-speech state probability ratio by using the results of multiplication.

11. The voice activity detection method according to one of claims 7, 8, 9, and 10, wherein the speech detection information generation step comprises:

a speech state probability to non-speech state probability ratio calculation step of calculating the probability ratio based on a state transition model of the speech state and the non-speech state, by using the output probabilities of the dominant distributions; and a voice activity detection step of judging, in a voice activity detection unit, from the probability ratio, whether the acoustic signal of the frame is in the speech state or in the non-speech state and generating the speech detection information based on the judgment result.

12. The voice activity detection method according to one of claims 7, 8, 9, and 10, further comprising a noise suppression step of receiving the probability ratio calculated in the speech detection information generation step and the output probability calculated in the acoustic signal analysis step, generates a noise suppression filter, and suppresses noise in the digital acoustic signal.

13. A non-transitory computer readable storage device having recorded thereon a program for causing a computer to function as the apparatus according to claim 1.

14. A voice activity detection apparatus comprising:
circuitry configured to
receive a digital acoustic signal containing a speech signal and a noise signal; generate a non-speech Gaussian mixture model, a Gaussian mixture model being hereafter referred to as a GMM, and a speech GMM both adapted to a noise environment, by using a silence GMM and a clean-speech GMM both generated beforehand for each frame of the digital acoustic signal; and calculate non-speech probabilities and speech probabilities of Gaussian distributions left after one or more Gaussian distributions having the smallest output probability are pruned from the GMMs;
calculate a speech state probability to non-speech state probability ratio based on a state transition model of a speech state and a non-speech state, by using the non-speech probabilities and the speech probabilities, generate information about a speech period based on the calculated probability ratio, and outputs the information as speech detection information;
estimate initial noise probabilistic model parameters;
predict noise probabilistic model parameters of the current frame from estimated noise probabilistic model parameters of a preceding frame by a random walk process;
receive the noise probabilistic model parameters of the current frame and updates parameters of all Gaussian distributions contained in the silence GMM and the clean-speech GMM;
generate a non-speech GMM and a speech GMM adapted to the noise environment in the current frame by using the updated parameters of the Gaussian distributions and parameters of various Gaussian distributions of the silence GMM and the clean-speech GMM;
calculate the output probability of each Gaussian distribution contained in the generated GMMs;
calculate probability weights used for weighting the output probabilities of the Gaussian distributions in the non-speech state and the speech state, by parameterizing the distribution of the output probabilities of the Gaussian distributions with a higher-order statistic;
prune Gaussian distributions having an extremely small output probability and extract only Gaussian distributions having a sufficiently large output probability;
obtain a first weighted average of the noise probabilistic model parameters of the predicted current frame, by using the calculated probability weights; and
obtain a second weighted average of noise probabilistic model parameters subjected to the first weighted average, only for the extracted Gaussian distributions.

* * * * *